US012737222B2

(12) United States Patent
Minezaki et al.

(10) Patent No.: US 12,737,222 B2
(45) Date of Patent: Sep. 15, 2026

(54) INFORMATION PROCESSING DEVICE, OPERATION CONTROL METHOD, AND COMPUTER-READABLE RECORDING MEDIUM STORING OPERATION CONTROL PROGRAM

(71) Applicant: Fsas Technologies Inc., Kawasaki (JP)

(72) Inventors: Juntaro Minezaki, Chofu (JP); Kenichiro Takeda, Yokohama (JP)

(73) Assignee: FSAS TECHNOLOGIES INC., Kawasaki (JP)

( * ) Notice: Subject to any disclaimer, the term of this patent is extended or adjusted under 35 U.S.C. 154(b) by 901 days.

(21) Appl. No.: 17/879,810

(22) Filed: Aug. 3, 2022

(65) Prior Publication Data

US 2022/0391254 A1 Dec. 8, 2022

Related U.S. Application Data

(63) Continuation of application No. PCT/JP2020/010865, filed on Mar. 12, 2020.

(51) Int. Cl.

*G06F 9/50* (2006.01)
*G06F 9/455* (2018.01)
*G06F 13/42* (2006.01)

(52) U.S. Cl.

CPC ........ *G06F 9/5011* (2013.01); *G06F 9/45558* (2013.01); *G06F 13/4221* (2013.01);

(Continued)

(58) Field of Classification Search

CPC ............... G06F 9/5011; G06F 9/45558; G06F 13/4221; G06F 2009/45579;

(Continued)

(56) References Cited

U.S. PATENT DOCUMENTS

2004/0187106 A1 9/2004 Tanaka et al.
2011/0052153 A1 3/2011 Tanaka et al.

(Continued)

FOREIGN PATENT DOCUMENTS

JP H09-062607 A 3/1997
JP 2004-252591 A 9/2004

(Continued)

OTHER PUBLICATIONS

Shingo Takada et al., "Secure OS Boot Control Using USB Token Authentication", Information Processing Society of Japan, Proceedings of the 70th National Convention of IPSJ ((3) Network Security), pp. 3-99 to 3-100, Mar. 13, 2008 (Total 15 pages) (Cited in ISR).

(Continued)

*Primary Examiner* — Bradley A Teets
*Assistant Examiner* — Ari F Riggins
(74) *Attorney, Agent, or Firm* — STAAS & HALSEY LLP

(57) ABSTRACT

An information processing device includes: a memory; and a processor coupled to the memory and configured to: notify a first virtual machine that is an allocation destination of an expansion card of that the expansion card is removed in a pseudo manner in a case where an operation on the expansion card mounted on an expansion slot of the information processing device is requested; switch the allocation destination of the expansion card from the first virtual machine to a second virtual machine dedicated to setting in a case where the removal of the expansion card is notified in the pseudo manner; switch the allocation destination of the expansion card from the second virtual machine to the first virtual machine in a case where the operation on the expansion card ends; and notify the first virtual machine of that the expansion card after the operation end is inserted.

7 Claims, 24 Drawing Sheets

(52) U.S. Cl.
CPC .............. *G06F 2009/45579* (2013.01); *G06F 2213/0026* (2013.01)

(58) Field of Classification Search
CPC ........... G06F 2213/0026; G06F 9/5077; G06F 13/10; G06F 13/38; Y02D 10/00
See application file for complete search history.

(56) References Cited

U.S. PATENT DOCUMENTS

| | | | | |
|---|---|---|---|---|
| 2015/0268966 | A1* | 9/2015 | Gschwind | G06F 9/4403 713/2 |
| 2016/0080468 | A1* | 3/2016 | Lambert | H04L 67/75 709/202 |
| 2017/0054593 | A1* | 2/2017 | Borikar | H04L 41/0816 |
| 2018/0232225 | A1* | 8/2018 | Fukui | G06F 8/65 |
| 2019/0146943 | A1* | 5/2019 | Fender | G06F 30/34 710/105 |
| 2021/0232404 | A1* | 7/2021 | Gore | G06F 9/4401 |

FOREIGN PATENT DOCUMENTS

| | | | |
|---|---|---|---|
| JP | 2009-205195 | A | 9/2009 |
| JP | 2019-139417 | A | 8/2019 |
| WO | 2010/007757 | A1 | 1/2010 |

OTHER PUBLICATIONS

Peter Trommer, "No. 2: Java-Compatible Next-Generation Card Utilization Method (Part2: Smart Cards and the OpenCard Framework (Part 2)", Java World, vol. 2, No. 5, pp. 141-145, May 1, 1998 (Total 14 pages) (Cited in ISR).

International Search Report and Written Opinion of the International Searching Authority (Form PCT/ISA/210, 220, and 237), mailed in connection with PCT/JP2020/010865 and mailed Aug. 25, 2020 (Total 11 pages).

* cited by examiner

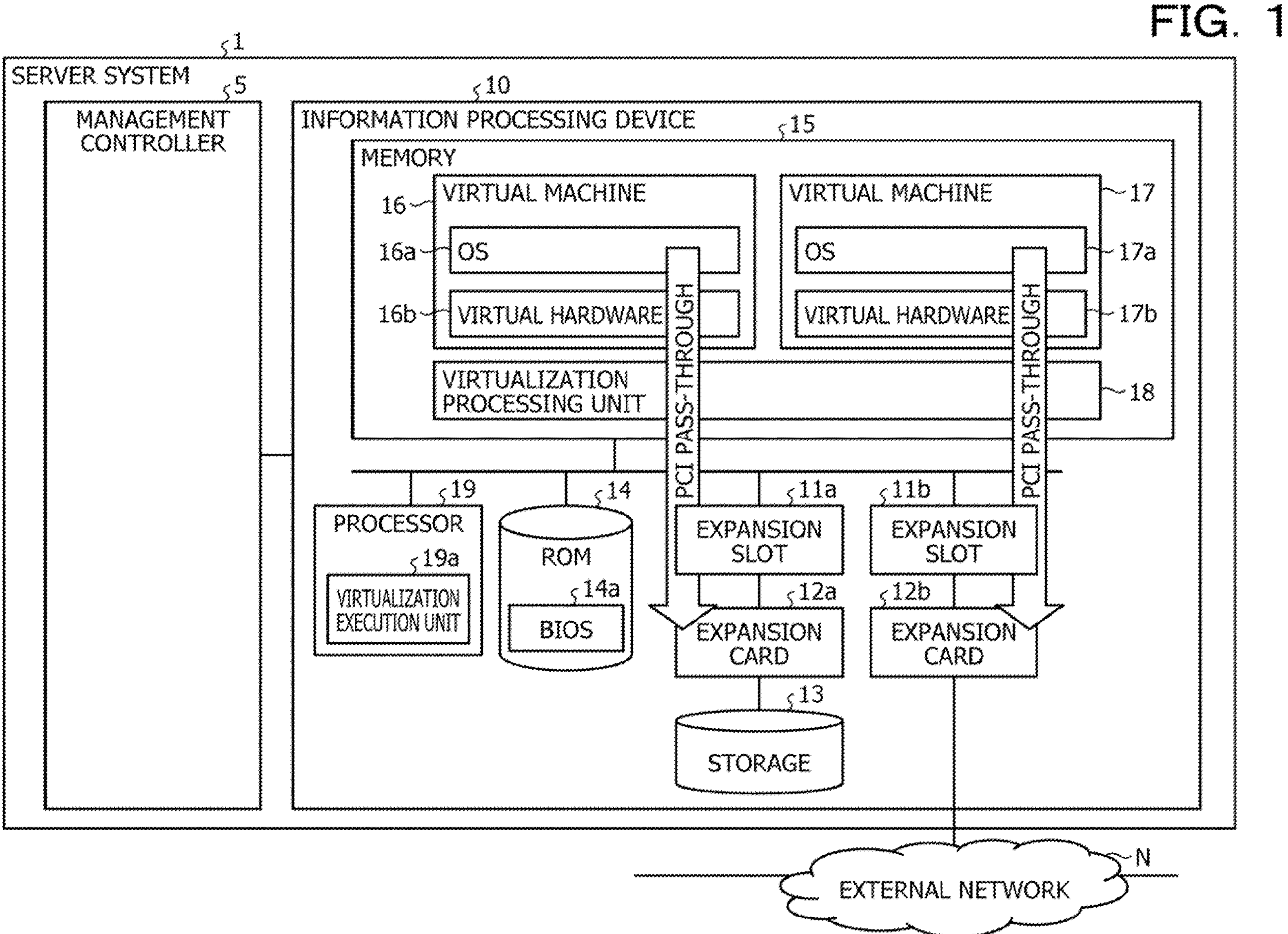
FIG. 1
SERVER SYSTEM
1
MANAGEMENT CONTROLLER
5
INFORMATION PROCESSING DEVICE
10
MEMORY
15
VIRTUAL MACHINE
16
OS
16a
VIRTUAL HARDWARE
16b
VIRTUAL MACHINE
17
OS
17a
VIRTUAL HARDWARE
17b
VIRTUALIZATION PROCESSING UNIT
18
PCI PASS-THROUGH
PCI PASS-THROUGH
PROCESSOR
19
VIRTUALIZATION EXECUTION UNIT
19a
ROM
14
BIOS
14a
EXPANSION SLOT
11a
EXPANSION SLOT
11b
EXPANSION CARD
12a
EXPANSION CARD
12b
STORAGE
13
EXTERNAL NETWORK
N

FIG. 7

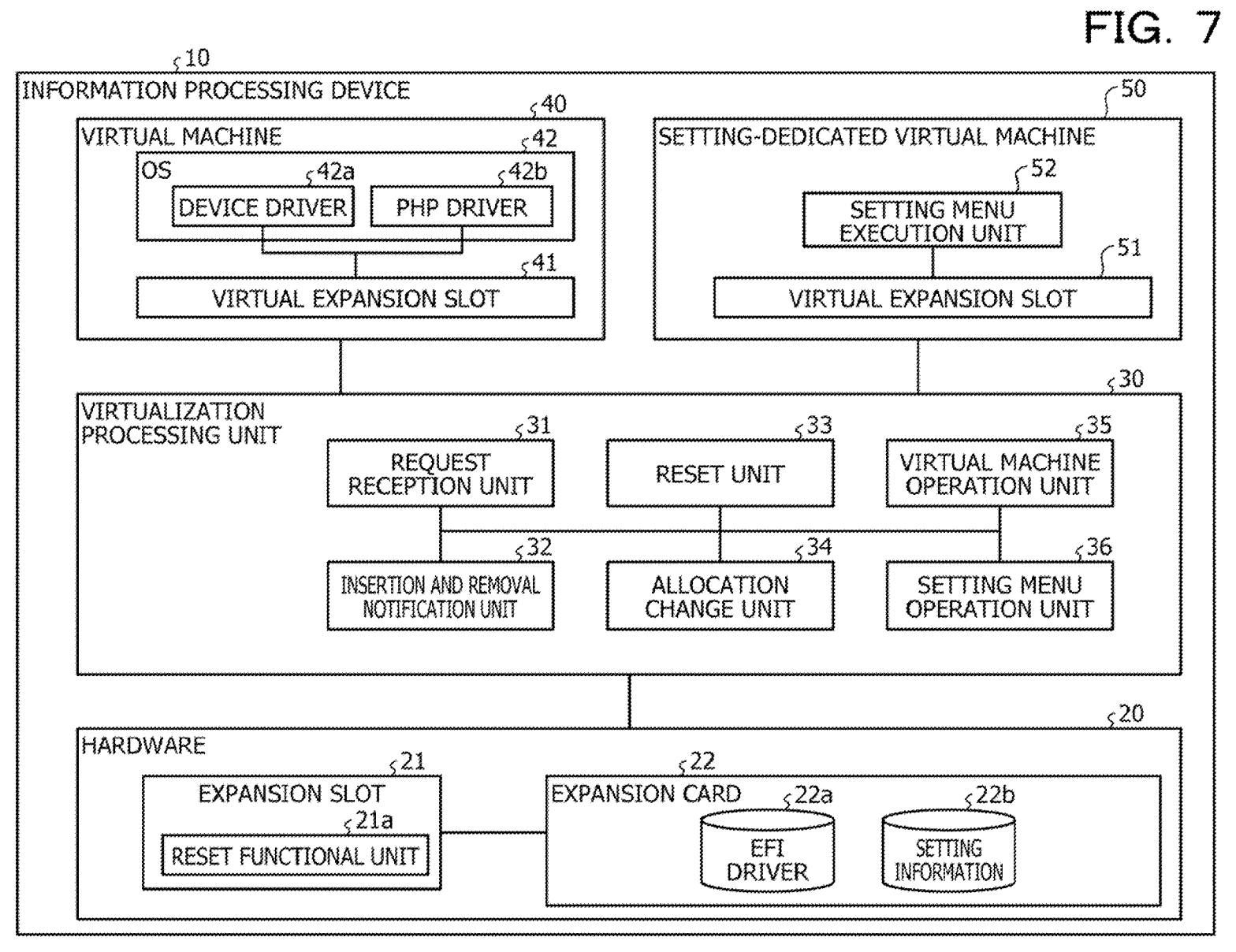

10 INFORMATION PROCESSING DEVICE

40 VIRTUAL MACHINE
42 OS
42a DEVICE DRIVER
42b PHP DRIVER
41 VIRTUAL EXPANSION SLOT

50 SETTING-DEDICATED VIRTUAL MACHINE
52 SETTING MENU EXECUTION UNIT
51 VIRTUAL EXPANSION SLOT

30 VIRTUALIZATION PROCESSING UNIT
31 REQUEST RECEPTION UNIT
32 INSERTION AND REMOVAL NOTIFICATION UNIT
33 RESET UNIT
34 ALLOCATION CHANGE UNIT
35 VIRTUAL MACHINE OPERATION UNIT
36 SETTING MENU OPERATION UNIT

20 HARDWARE
21 EXPANSION SLOT
21a RESET FUNCTIONAL UNIT
22 EXPANSION CARD
22a EFI DRIVER
22b SETTING INFORMATION

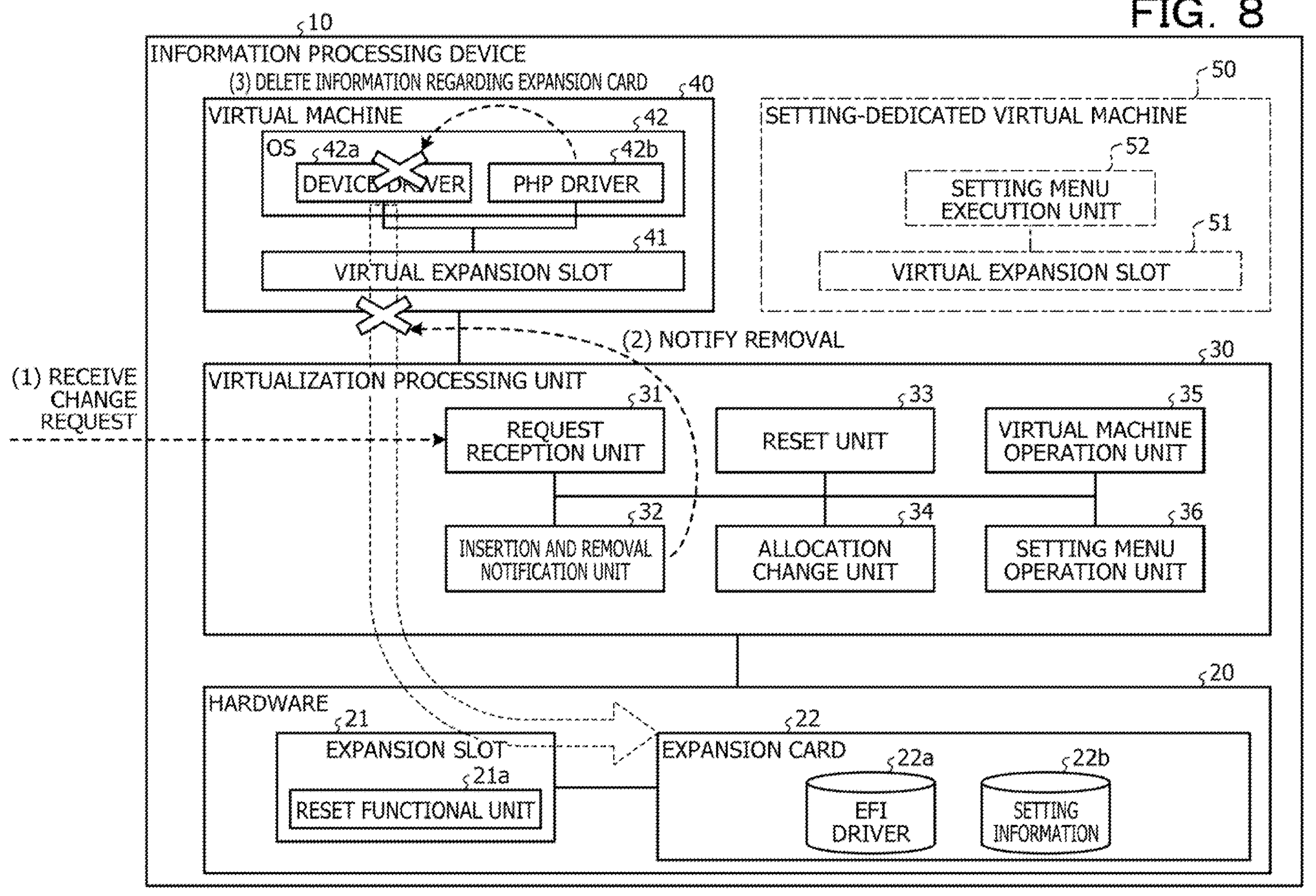
FIG. 8
10
INFORMATION PROCESSING DEVICE
(3) DELETE INFORMATION REGARDING EXPANSION CARD
40
VIRTUAL MACHINE
42
OS
42a
DEVICE DRIVER
42b
PHP DRIVER
41
VIRTUAL EXPANSION SLOT
50
SETTING-DEDICATED VIRTUAL MACHINE
52
SETTING MENU EXECUTION UNIT
51
VIRTUAL EXPANSION SLOT
(2) NOTIFY REMOVAL
(1) RECEIVE CHANGE REQUEST
30
VIRTUALIZATION PROCESSING UNIT
31
REQUEST RECEPTION UNIT
33
RESET UNIT
35
VIRTUAL MACHINE OPERATION UNIT
32
INSERTION AND REMOVAL NOTIFICATION UNIT
34
ALLOCATION CHANGE UNIT
36
SETTING MENU OPERATION UNIT
20
HARDWARE
21
EXPANSION SLOT
21a
RESET FUNCTIONAL UNIT
22
EXPANSION CARD
22a
EFI DRIVER
22b
SETTING INFORMATION

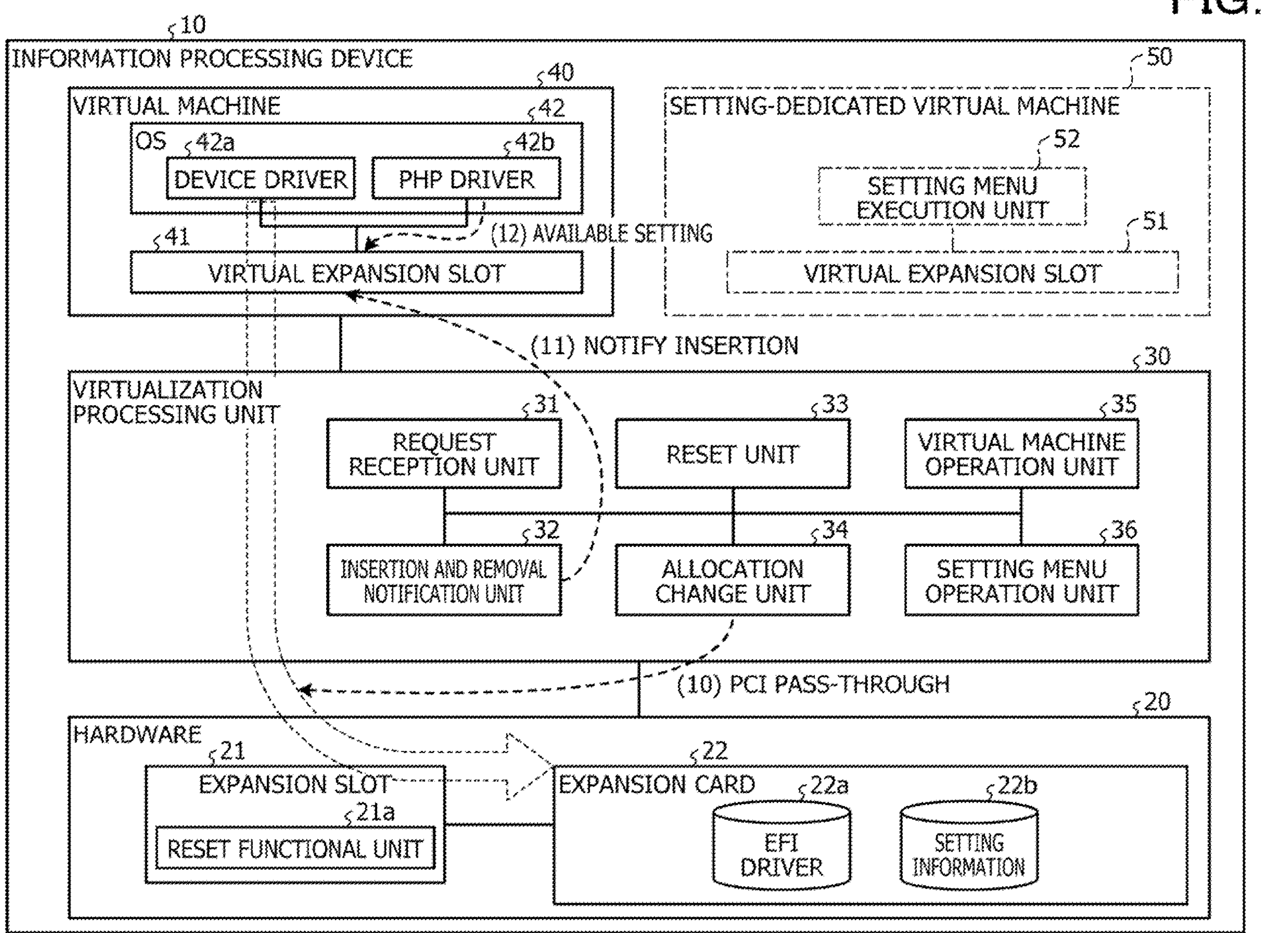

FIG. 12
10
INFORMATION PROCESSING DEVICE
40
VIRTUAL MACHINE
42
OS
42a
DEVICE DRIVER
42b
PHP DRIVER
(12) AVAILABLE SETTING
41
VIRTUAL EXPANSION SLOT
50
SETTING-DEDICATED VIRTUAL MACHINE
52
SETTING MENU EXECUTION UNIT
51
VIRTUAL EXPANSION SLOT
(11) NOTIFY INSERTION
30
VIRTUALIZATION PROCESSING UNIT
31
REQUEST RECEPTION UNIT
33
RESET UNIT
35
VIRTUAL MACHINE OPERATION UNIT
32
INSERTION AND REMOVAL NOTIFICATION UNIT
34
ALLOCATION CHANGE UNIT
36
SETTING MENU OPERATION UNIT
(10) PCI PASS-THROUGH
20
HARDWARE
21
EXPANSION SLOT
21a
RESET FUNCTIONAL UNIT
22
EXPANSION CARD
22a
EFI DRIVER
22b
SETTING INFORMATION

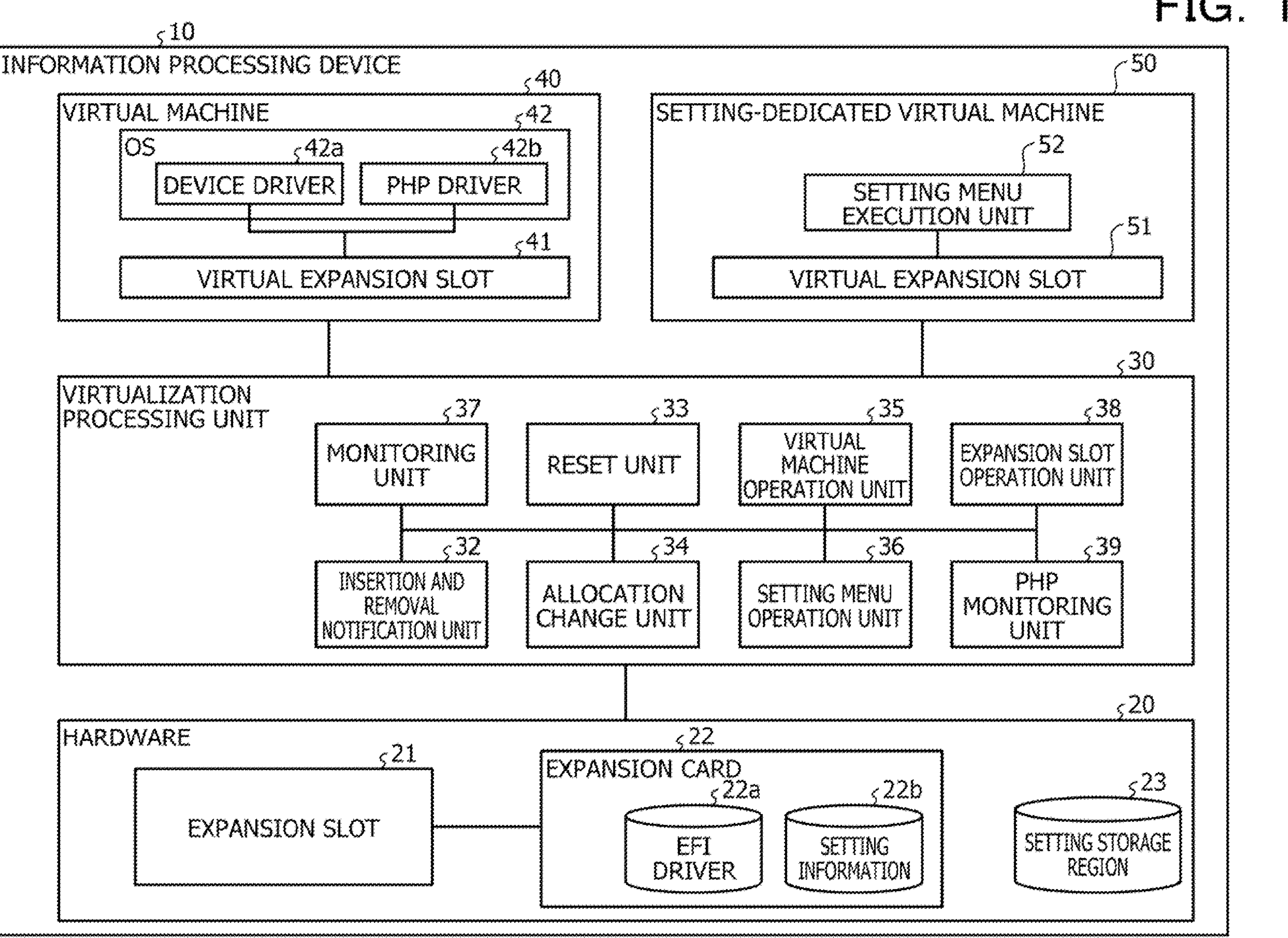
FIG. 14
10
INFORMATION PROCESSING DEVICE
40
VIRTUAL MACHINE
42
OS
42a
DEVICE DRIVER
42b
PHP DRIVER
41
VIRTUAL EXPANSION SLOT
50
SETTING-DEDICATED VIRTUAL MACHINE
52
SETTING MENU EXECUTION UNIT
51
VIRTUAL EXPANSION SLOT
30
VIRTUALIZATION PROCESSING UNIT
37
MONITORING UNIT
33
RESET UNIT
35
VIRTUAL MACHINE OPERATION UNIT
38
EXPANSION SLOT OPERATION UNIT
32
INSERTION AND REMOVAL NOTIFICATION UNIT
34
ALLOCATION CHANGE UNIT
36
SETTING MENU OPERATION UNIT
39
PHP MONITORING UNIT
20
HARDWARE
21
EXPANSION SLOT
22
EXPANSION CARD
22a
EFI DRIVER
22b
SETTING INFORMATION
23
SETTING STORAGE REGION

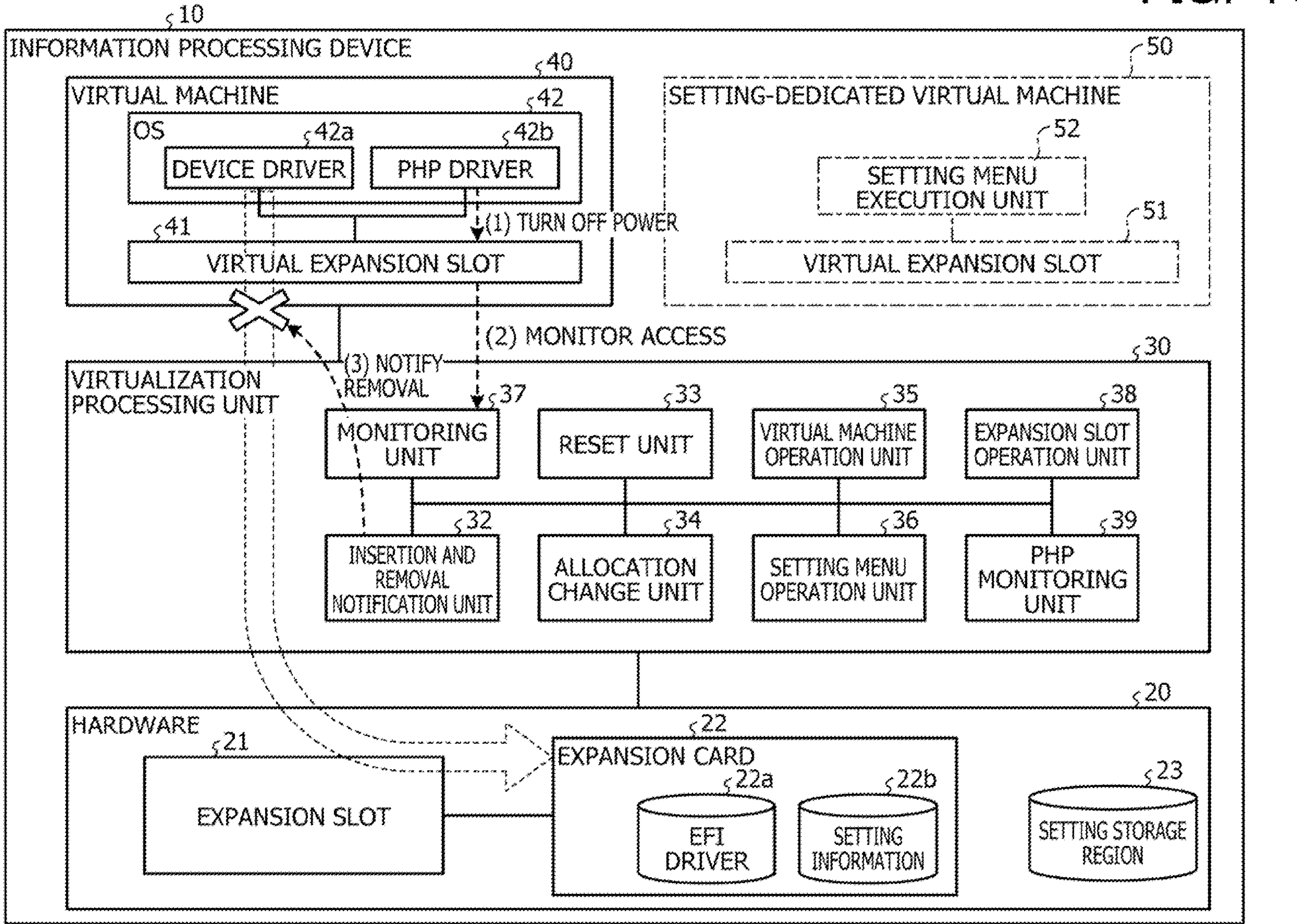
FIG. 15
10
INFORMATION PROCESSING DEVICE
40
VIRTUAL MACHINE
42
OS
42a
DEVICE DRIVER
42b
PHP DRIVER
(1) TURN OFF POWER
41
VIRTUAL EXPANSION SLOT
50
SETTING-DEDICATED VIRTUAL MACHINE
52
SETTING MENU EXECUTION UNIT
51
VIRTUAL EXPANSION SLOT
(2) MONITOR ACCESS
(3) NOTIFY REMOVAL
30
VIRTUALIZATION PROCESSING UNIT
37
MONITORING UNIT
33
RESET UNIT
35
VIRTUAL MACHINE OPERATION UNIT
38
EXPANSION SLOT OPERATION UNIT
32
INSERTION AND REMOVAL NOTIFICATION UNIT
34
ALLOCATION CHANGE UNIT
36
SETTING MENU OPERATION UNIT
39
PHP MONITORING UNIT
20
HARDWARE
21
EXPANSION SLOT
22
EXPANSION CARD
22a
EFI DRIVER
22b
SETTING INFORMATION
23
SETTING STORAGE REGION

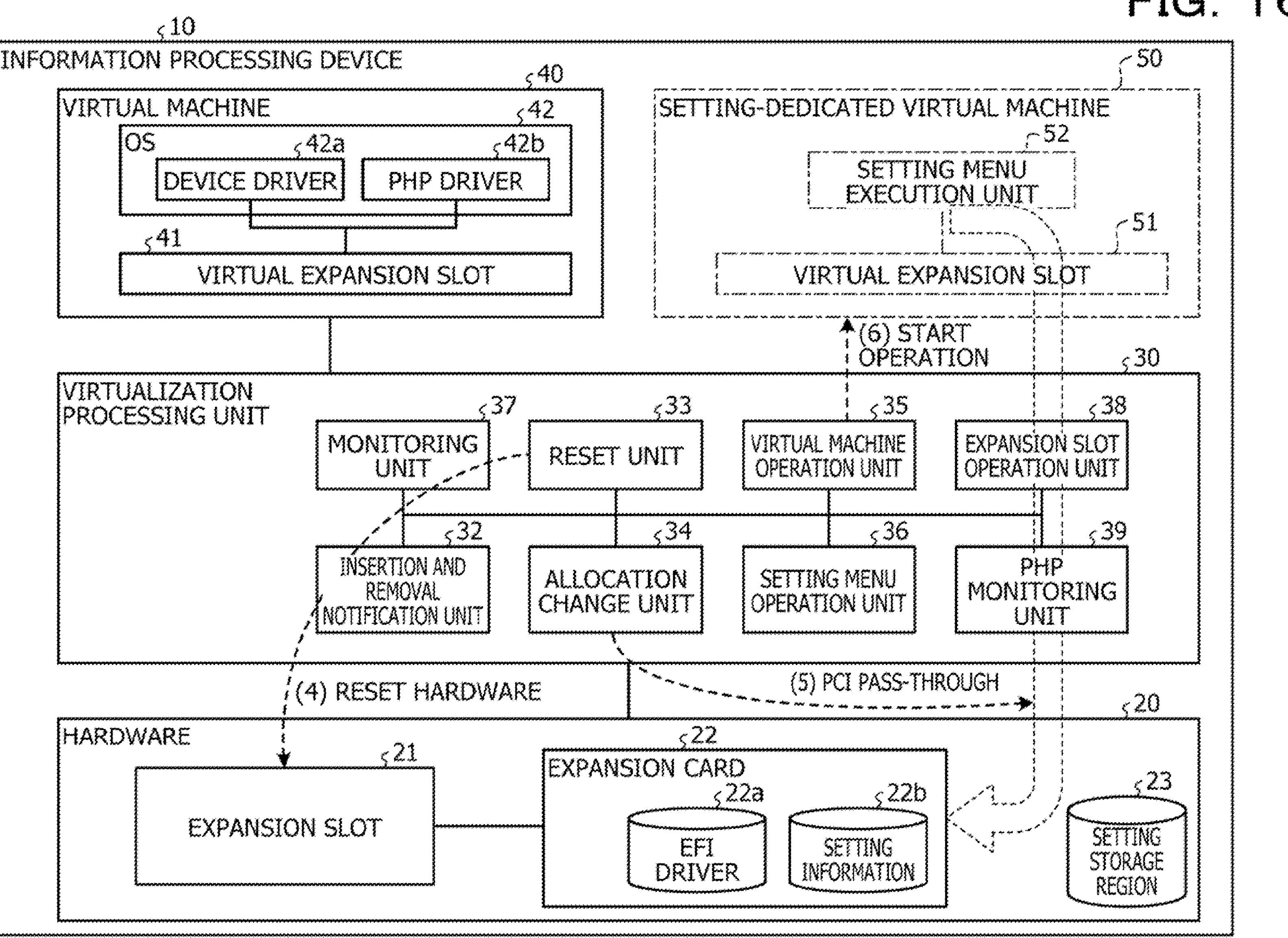
FIG. 16
10
INFORMATION PROCESSING DEVICE
40
VIRTUAL MACHINE
42
OS
42a
DEVICE DRIVER
42b
PHP DRIVER
41
VIRTUAL EXPANSION SLOT
50
SETTING-DEDICATED VIRTUAL MACHINE
52
SETTING MENU EXECUTION UNIT
51
VIRTUAL EXPANSION SLOT
(6) START OPERATION
30
VIRTUALIZATION PROCESSING UNIT
37
MONITORING UNIT
33
RESET UNIT
35
VIRTUAL MACHINE OPERATION UNIT
38
EXPANSION SLOT OPERATION UNIT
32
INSERTION AND REMOVAL NOTIFICATION UNIT
34
ALLOCATION CHANGE UNIT
36
SETTING MENU OPERATION UNIT
39
PHP MONITORING UNIT
(4) RESET HARDWARE
(5) PCI PASS-THROUGH
20
HARDWARE
21
EXPANSION SLOT
22
EXPANSION CARD
22a
EFI DRIVER
22b
SETTING INFORMATION
23
SETTING STORAGE REGION

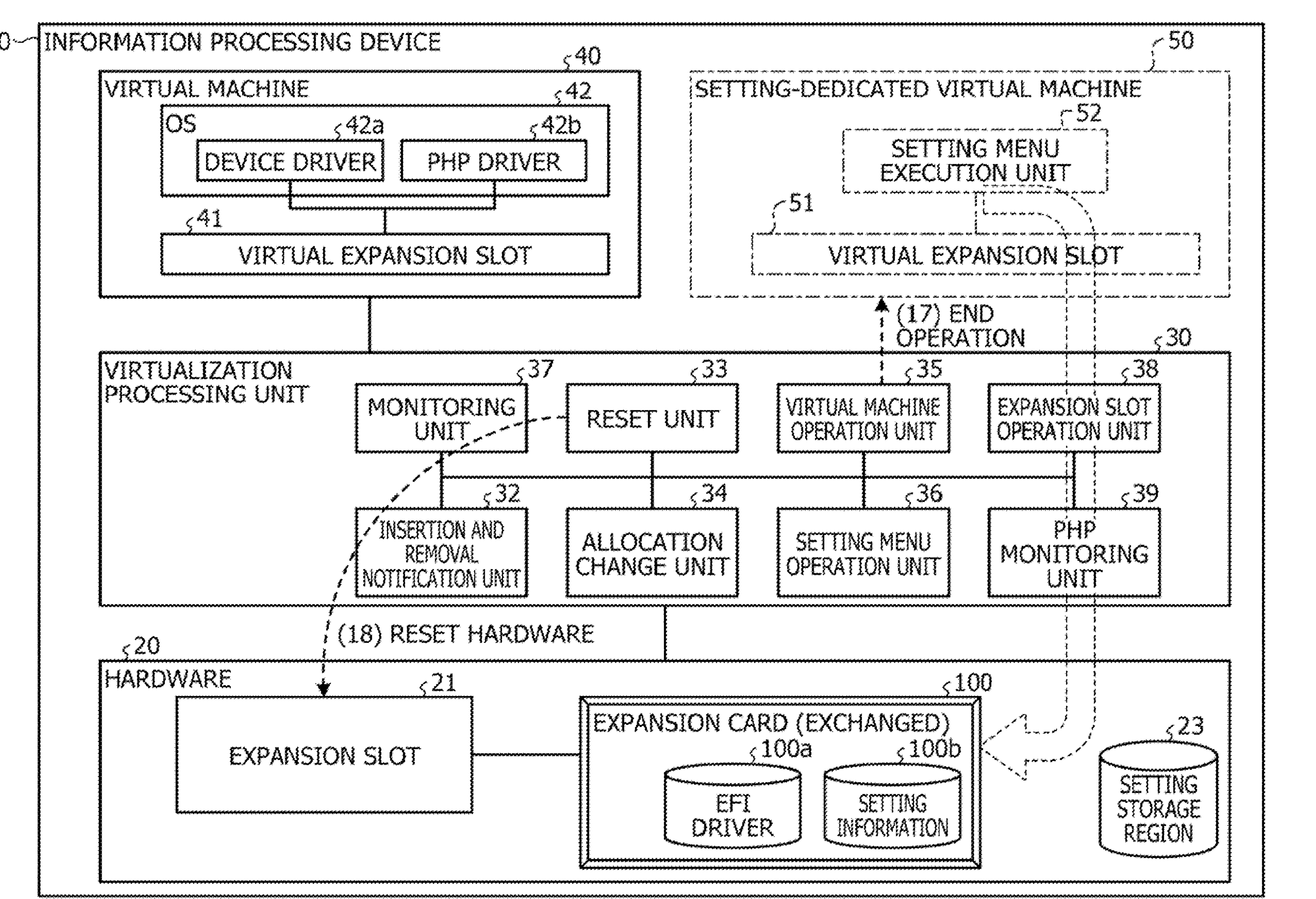
FIG. 21
10
INFORMATION PROCESSING DEVICE
40
VIRTUAL MACHINE
42
OS
42a
DEVICE DRIVER
42b
PHP DRIVER
41
VIRTUAL EXPANSION SLOT
50
SETTING-DEDICATED VIRTUAL MACHINE
52
SETTING MENU EXECUTION UNIT
51
VIRTUAL EXPANSION SLOT
(17) END OPERATION
30
VIRTUALIZATION PROCESSING UNIT
37
MONITORING UNIT
33
RESET UNIT
35
VIRTUAL MACHINE OPERATION UNIT
38
EXPANSION SLOT OPERATION UNIT
32
INSERTION AND REMOVAL NOTIFICATION UNIT
34
ALLOCATION CHANGE UNIT
36
SETTING MENU OPERATION UNIT
39
PHP MONITORING UNIT
(18) RESET HARDWARE
20
HARDWARE
21
EXPANSION SLOT
100
EXPANSION CARD (EXCHANGED)
100a
EFI DRIVER
100b
SETTING INFORMATION
23
SETTING STORAGE REGION

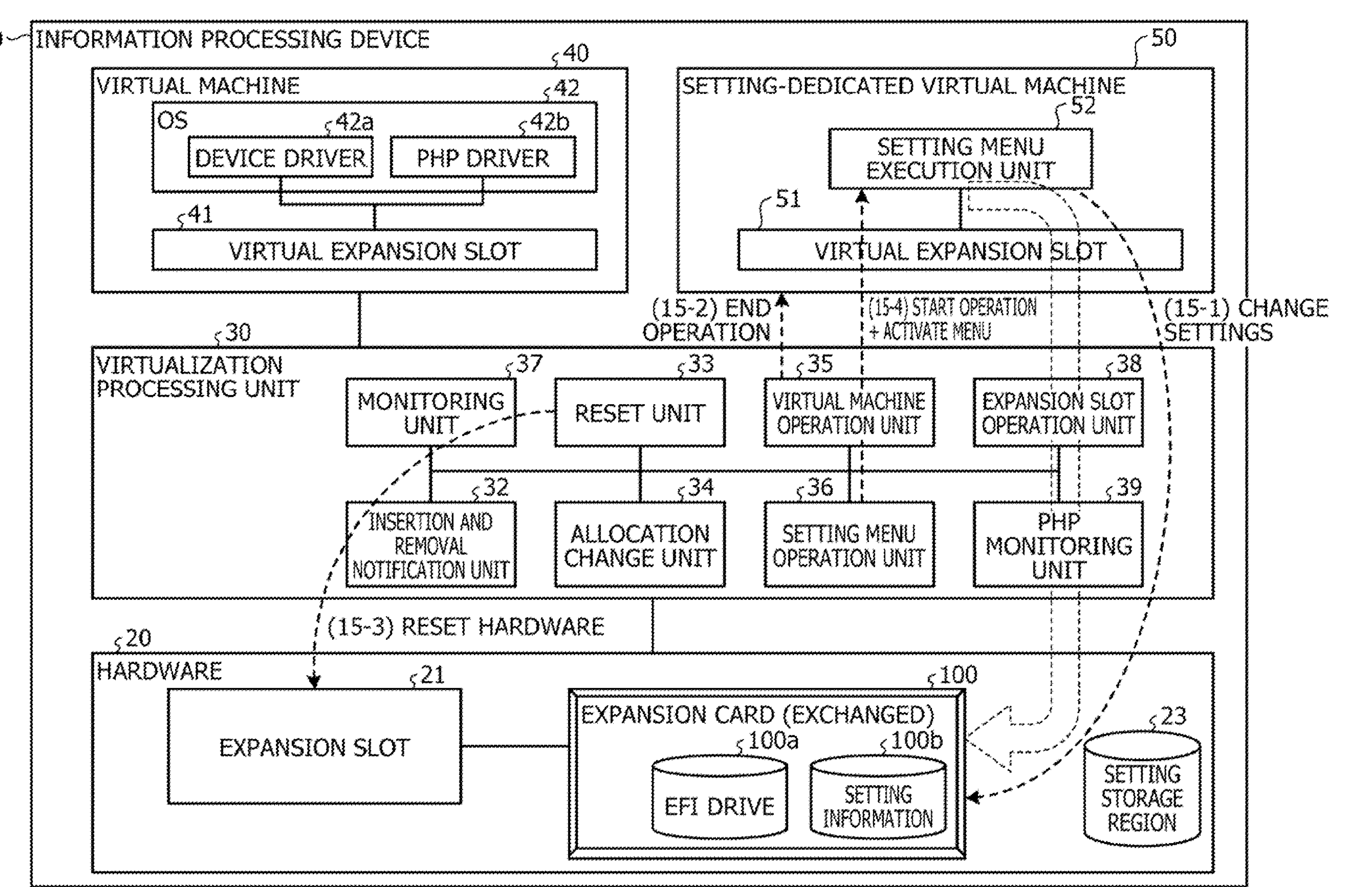
FIG. 23
10
INFORMATION PROCESSING DEVICE
40
VIRTUAL MACHINE
42
OS
42a
DEVICE DRIVER
42b
PHP DRIVER
41
VIRTUAL EXPANSION SLOT
50
SETTING-DEDICATED VIRTUAL MACHINE
52
SETTING MENU EXECUTION UNIT
51
VIRTUAL EXPANSION SLOT
(15-2) END OPERATION
(15-4) START OPERATION + ACTIVATE MENU
(15-1) CHANGE SETTINGS
30
VIRTUALIZATION PROCESSING UNIT
37
MONITORING UNIT
33
RESET UNIT
35
VIRTUAL MACHINE OPERATION UNIT
38
EXPANSION SLOT OPERATION UNIT
32
INSERTION AND REMOVAL NOTIFICATION UNIT
34
ALLOCATION CHANGE UNIT
36
SETTING MENU OPERATION UNIT
39
PHP MONITORING UNIT
(15-3) RESET HARDWARE
20
HARDWARE
21
EXPANSION SLOT
100
EXPANSION CARD (EXCHANGED)
100a
EFI DRIVE
100b
SETTING INFORMATION
23
SETTING STORAGE REGION

INFORMATION PROCESSING DEVICE, OPERATION CONTROL METHOD, AND COMPUTER-READABLE RECORDING MEDIUM STORING OPERATION CONTROL PROGRAM

CROSS-REFERENCE TO RELATED APPLICATION

This application is a continuation application of International Application PCT/JP2020/010865 filed on Mar. 12, 2020 and designated the U.S., the entire contents of which are incorporated herein by reference.

FIELD

The embodiments discussed herein are related to an information processing device, an operation control method, and an operation control program.

BACKGROUND

On an information processing device used in various server systems, a central processing unit (CPU), a memory that is a primary storage region, a non-volatile memory that stores an initialization program of the information processing device, or the like are mounted. Furthermore, in order to enable to connect peripheral devices according to use applications of the server system, the information processing device generally includes an expansion slot. Through an expansion card mounted on the expansion slot, it is possible to connect to an operating system (OS), a storage device that stores data, an external network, or the like. Here, as a standard of an expansion slot and an expansion card that are most generally used for the information processing device, the PCI Express (hereinafter, may be referred to as "PCIe") is known.

Japanese Laid-open Patent Publication No. 2004-252591 is disclosed as related art.

SUMMARY

According to an aspect of the embodiments, an information processing device includes: a memory; and a processor coupled to the memory and configured to: notify a first virtual machine that is an allocation destination of an expansion card of that the expansion card is removed in a pseudo manner in a case where an operation on the expansion card mounted on an expansion slot of the information processing device is requested; switch the allocation destination of the expansion card from the first virtual machine to a second virtual machine dedicated to setting in a case where the removal of the expansion card is notified in the pseudo manner; switch the allocation destination of the expansion card from the second virtual machine to the first virtual machine in a case where the operation on the expansion card ends; and notify the first virtual machine of that the expansion card after the operation end is inserted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for explaining a server system 1 according to a first embodiment;

FIG. 7 is a block diagram for explaining functions of an information processing device according to the first embodiment;

FIG. 8 is a diagram for explaining a procedure 1 for changing an operation mode of an expansion card according to the first embodiment;

FIG. 12 is a diagram for explaining a procedure 5 for changing the operation mode of the expansion card according to the first embodiment;

FIG. 14 is a block diagram for explaining functions of an information processing device according to a second embodiment;

FIG. 15 is a diagram for explaining a procedure 1 for activation exchange of an expansion card according to the second embodiment;

FIG. 16 is a diagram for explaining a procedure 2 for the activation exchange of the expansion card according to the second embodiment;

FIG. 21 is a diagram for explaining a procedure 7 for the activation exchange of the expansion card according to the second embodiment;

FIG. 23 is a diagram for explaining a procedure for changing an operation mode at the time of the activation exchange according to the second embodiment.

DESCRIPTION OF EMBODIMENTS

Figure 2:
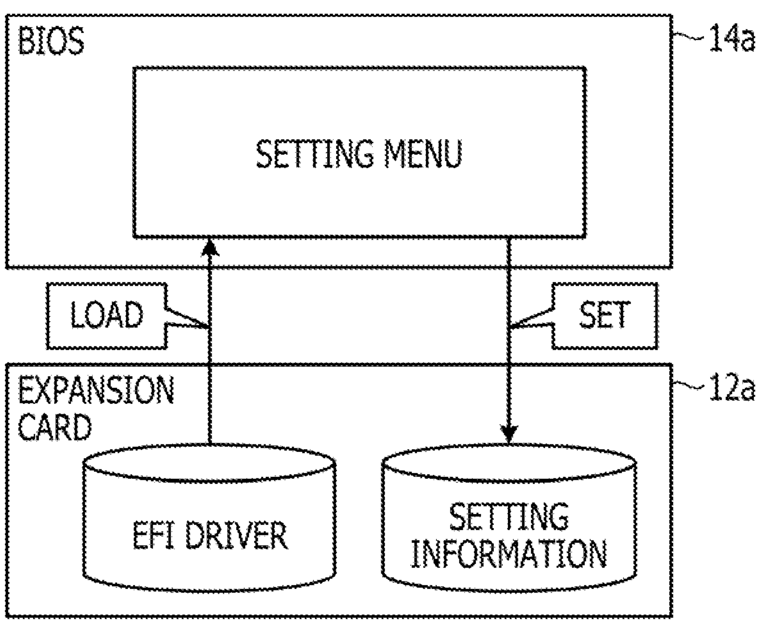
FIG. 2 is a diagram for explaining settings of an expansion card from a BIOS.

When power of the information processing device is turned on in a general server system, a basic input/output system (BIOS) that is an initialization program of the information processing device, a unified extensible firmware interface (UEFI), or the like are executed. After allocating necessary hardware resources to hardware mounted on the information processing device such as the CPU, the memory, the expansion slot, or the expansion card and performing initialization, the BIOS or the like loads a boot loader of the OS mounted on the storage to the memory and executes the boot loader. Here, for the hardware initialization of the expansion card, program data stored in a read only memory (ROM) of the expansion card may be used. After processing is passed to the boot loader of the OS, an application that accompanies with the OS on the information processing device is activated, and the system operates. During the system operation, a device driver of the OS has a role in operating the expansion card.

Furthermore, a user may make specific settings to the expansion card according to a configuration of the server system. For example, in a case of a network adapter, an internet protocol (IP) address and a connection speed of a connection destination network can be set, in a case of a fiber channel card, information regarding a storage area network of a connection destination can be set, and in a case of a host bus adapter, a storage to be connected and a redundant arrays of inexpensive disks (RAID) can be set.

For settings of such an expansion card, a method for setting from a BIOS, a method for setting from an OS standard function, and a method for setting from private setting software, which are roughly divided, are used. Furthermore, in order to cope with active removal and active insertion of the expansion card, for the PCIe, an optional function called PCIe Hot-Plug (hereinafter, may be referred to as "PHP") is specified in the specifications. By using the PHP, it is possible to exchange the expansion cards while the system is operating.

In recent years, due to an increasing in a speed of the PCIe standard, diversification of the applications of the server system, or the like, functions of the expansion card become more complicated. For example, an expansion card in a format of a converged network adapter (hereinafter, may be referred to as "CNA") has features that an operation mode of a network port can be changed to a network internet card (NIC), an internet small computer system interface (iSCSI), a fibre channel over Ethernet (FCoE), or the like by changing the settings of the expansion card. Because such settings are unique to the CNA, change from a standard function of the OS is not supported, and settings are changed using the BIOS or the private setting software in order to change the operation mode.

However, in order to change the operation mode of the CNA, stop of the system may be required due to a setting method, setting reflection, and setting recognition.

Typically, in order to reflect the change of the operation mode in the network port of the expansion card, hardware reset of the expansion card is required. Furthermore, when the change of the operation mode is reflected, the network port of the expansion card is changed to another type of device. Therefore, in order to normally operate the expansion card after the operation mode change has been reflected, the OS needs to change a hardware resource allocated to the expansion card and a device driver to be used to appropriate ones. However, because the OS does not assume that the mounted expansion card dynamically changes to another type of device, the hardware resource and the device driver are not automatically changed, and there is a possibility that the expansion card after the operation mode change is operated in an inappropriate state. Therefore, for the reflection in the hardware and in order to normally achieve an OS operation after reflection, restart of the system is required after the operation mode change.

Then, because the operation mode of the CNA is unique to the CNA, the change is set from the BIOS or the private setting software. Here, in a case where a card vendor does not provide the private setting software to the OS used in the system, the setting from the BIOS is used. However, in this case, because the system is once shut down and the BIOS is activated, stop of the system occurs.

Note that the system stop at the time of operation mode change is not limited to the CNA. This is a common problem for an expansion card that uses the private setting software for the setting change specific for the expansion card, requires the hardware reset to reflect the settings, and needs to change the allocation of the hardware resources and to reset the device driver to be used after the setting reflection.

In one aspect, an object is to provide an information processing device, an operation control method, and an operation control program that can change settings of an expansion card without stopping a system.

Hereinafter, embodiments of an information processing device, an operation control method, and an operation control program according to the present disclosure will be described in detail with reference to the drawings. Note that the embodiments do not limit the present disclosure. Furthermore, the individual embodiments may be appropriately combined within a range without inconsistency.

First Embodiment

[Overall Configuration]

FIG. 1 is a diagram for explaining a server system 1 according to a first embodiment. As illustrated in FIG. 1, the server system 1 includes an information processing device 10 in which a system operates and a management controller 5 that manages the information processing device 10. Normally, although only one operating system (OS) can operate in the information processing device 10 at the same time, virtualization of the information processing device 10 is a technology that eliminates this limitation and enables a plurality of OSs to operate at the same time.

As illustrated in FIG. 1, in the virtualization of the information processing device 10, by logically dividing physical resources such as a processor 19, a memory 15, an expansion slot 11*a*, an expansion slot 11*b*, an expansion card 12*a*, or an expansion card 12*b*, a plurality of virtual information processing devices (hereinafter, may be referred to as virtual machine (VM)) is constructed in the information processing device 10. By operating the OS on each virtual machine, the plurality of OSs can run in the information processing device 10.

For example, as illustrated in FIG. 1, a virtualization execution unit 19*a* of the processor 19 of the information processing device 10 develops a virtualization processing unit 18 corresponding to a virtual machine monitor represented by a hypervisor, a virtual machine monitor (VMM), or the like in the memory 15 so that the virtualization processing unit 18 that manages the physical resources and the virtual machine in the information processing device 10 operates in the memory 15. The virtualization processing unit 18 logically divides the physical resources, presents virtual hardware 16*b* that is virtual hardware to a virtual machine 16, and presents virtual hardware 17*b* to a virtual machine 17. The OS 16*a* of the virtual machine 16 and an OS 17*a* of the virtual machine 17 recognize each virtual hardware as if it is physical hardware and operate the system. Note that there is a plurality of ways of presenting the virtual hardware according to how the virtual machine is used or the like.

Here, first, PCI pass-through for a PCIe expansion card will be described. The PCI pass-through is a method for passing an access from the OS on the virtual machine to the expansion card or an access from the expansion card to the virtual machine almost as it is. By using the PCI pass-through, the OS on the virtual machine can be used in the same way as an environment where the expansion card is not virtualized.

For example, the OS 16*a* of the virtual machine 16 uses the expansion card 12*a* to be inserted from the virtual hardware 16*b* into the expansion slot 11*a* so as to access the storage 13 by using the PCI pass-through. Furthermore, the OS 17*a* of the virtual machine 17 uses the expansion card 12*b* to be inserted from the virtual hardware 17*a* into the expansion slot 11*b* so as to connect to an external network N such as the Internet, by using the PCI pass-through.

Note that, as another way of presenting the virtual hardware, a method called device emulation for imitating a behavior of hardware by the virtualization processing unit 18 is known. By using the device emulation method, it is possible to present hardware that is not mounted on the information processing device 10 to the virtual machine or to present only one hardware that is mounted to the plurality of virtual machines.

[Settings of Expansion Card]

Next, a method for setting the expansion cards 12*a* and 12*b* included in the information processing device 10 will be described. For settings of such an expansion card, a method for setting from a BIOS, a method for setting from an OS standard function, and a method for setting from private setting software, which are roughly divided, are used, and here, each setting method will be described.

(Settings from BIOS)

FIG. 2 is a diagram for explaining settings of an expansion card from a BIOS 14*a*. As an example, an example will be described where setting of the expansion card 12*a* is changed by using the BIOS 14*a* stored in the ROM 14 of the information processing device 10 illustrated in FIG. 2.

In the expansion card 12*a* of the PCIe, program data called an extensible firmware interface (EFI) driver is stored. As illustrated in FIG. 2, this program data is loaded from the BIOS 14*a* and is used to initialize or change settings of the expansion card 12*a*. The BIOS 14*a* displays a setting change menu of the expansion card 12*a* in its own setting menu, and a user sets the expansion card 12*a* through this menu. Here, because the setting change menu of the expansion card 12*a* is provided in a form conforming to the unified extensible firmware interface (UEFI) specifications, the setting change from the BIOS 14*a* can be generally used in a form without depending on a vendor of the expansion card 12*a* or the server system. Furthermore, because program data developed by a developer (hereinafter, may be described as "card vendor") of the expansion card 12*a* is used, all settings of the target expansion card 12*a* can be changed.

This method has an advantage that, since the EFI driver necessary for setting is stored in the expansion card 12*a*, all settings of the target expansion card can be changed without obtaining special software from outside. On the other hand, a disadvantage is that, because it is necessary to load the EFI driver from the BIOS 14*a*, it is not possible to use this method during the OS operation when the BIOS 14*a* does not operate. Note that, although a system management mode (SMM) provided by the BIOS 14*a* or a power supply management service (advanced configuration and power interface (ACPI)) may be called during the OS operation, it is not possible to load the EFI driver from these.

(Settings from OS)

Figure 3:
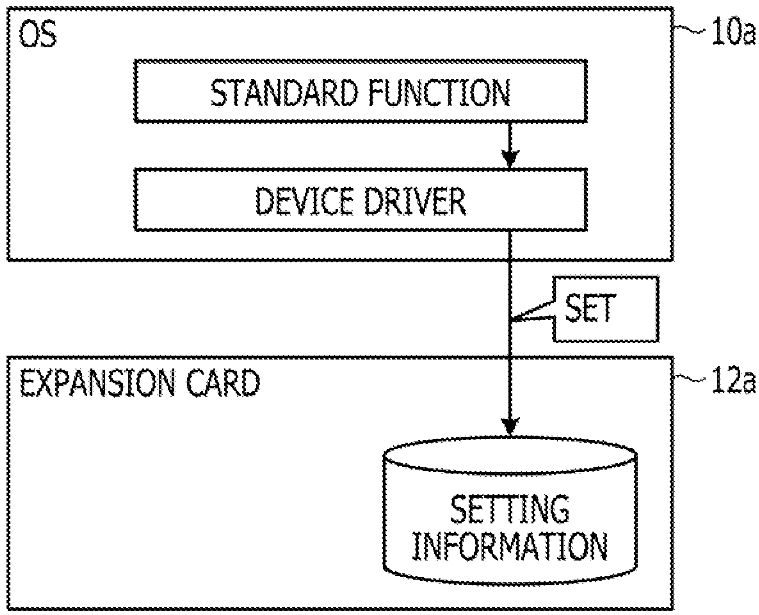
FIG. 3 is a diagram for explaining settings of an expansion card from an OS.

FIG. 3 is a diagram for explaining settings of an expansion card from an OS 10*a*. For example, an example will be described where the setting of the expansion card 12*a* is changed using the OS 10*a* of the information processing device 10 illustrated in FIG. 3.

For example, for general settings such as setting of an internet protocol (IP) address, the OS 10*a* provides a setting interface as a standard function. A user performs the setting using a standard command or standard software on the OS 10*a*. As illustrated in FIG. 3, the settings are reflected in a card via a device driver of the expansion card 12*a*. Although this method has an advantage that setting can be changed without installing software, this method has a disadvantage that settings that cannot be changed are included.

(Settings from Private Setting Software)

Figure 4:
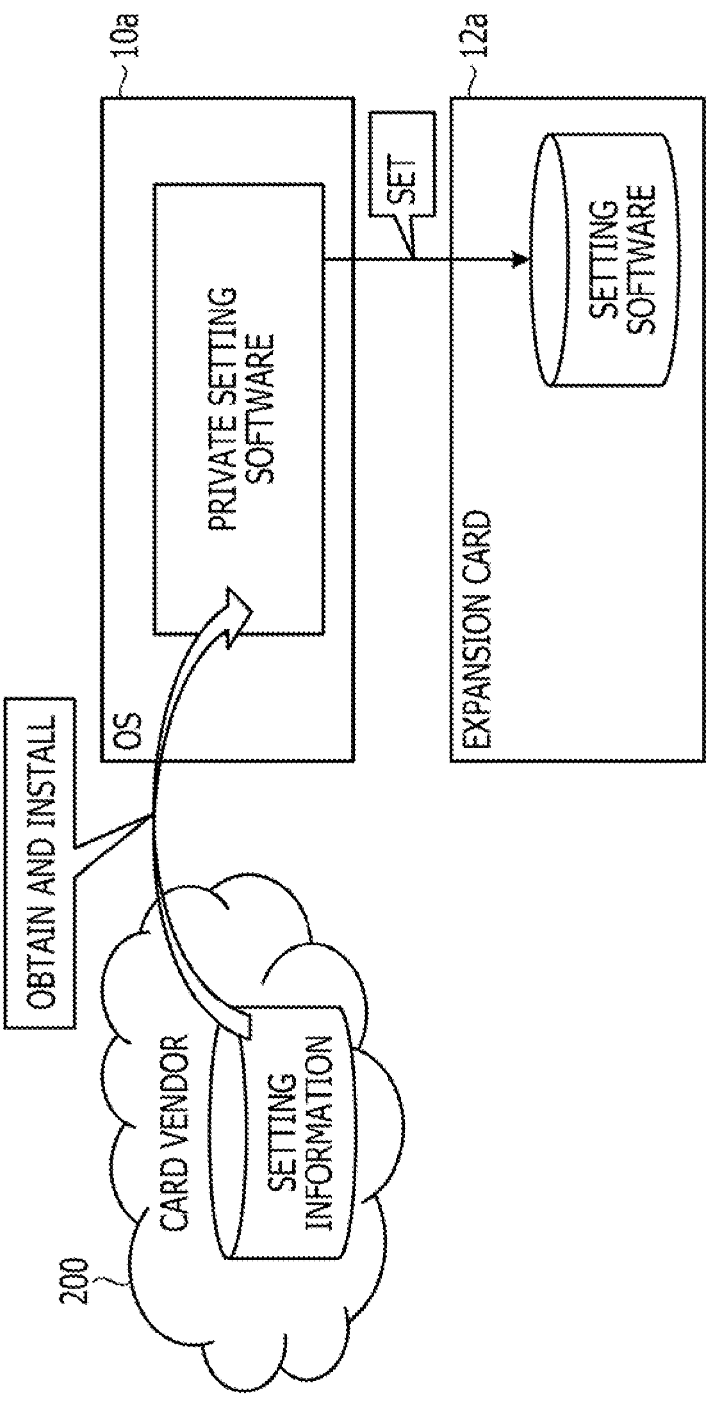
FIG. 4 is a diagram for explaining settings of an expansion card from private setting software.

FIG. 4 is a diagram for explaining settings of an expansion card from private setting software. For example, an example will be described where the OS 10*a* of the information processing device 10 illustrated in FIG. 4 changes the setting of the expansion card 12*a* using setting software of a card vendor 200.

In a case where the expansion card 12*a* has its own functions, it is not possible to change the setting from the standard function of the OS 10*a*. This is because it is not possible for the standard function of the OS 10*a* to follow the functions unique to the expansion card 12*a* or the standard function of the OS 10*a* does not plan to cope with the function because the expansion card 12*a* corresponding to the functions is limited, for example. In a case where setting in which the OS 10*a* does not provide the setting interface as a standard function from the OS 10*a*, it is necessary to use the setting software (private setting software) that is uniquely provided by the card vendor 200.

As illustrated in FIG. 4, the user obtains and installs the private setting software provided by the card vendor 200 and performs the setting using the private setting software. Although this method has an advantage that all the settings of the expansion card 12*a* to be set can be changed, this method has a disadvantage that it is necessary to obtain and install the private setting software and there is a possibility that the card vendor 200 does not provide the private setting software to the OS 10*a*.

[Exchange of Expansion Card with PHP]

Figure 5:
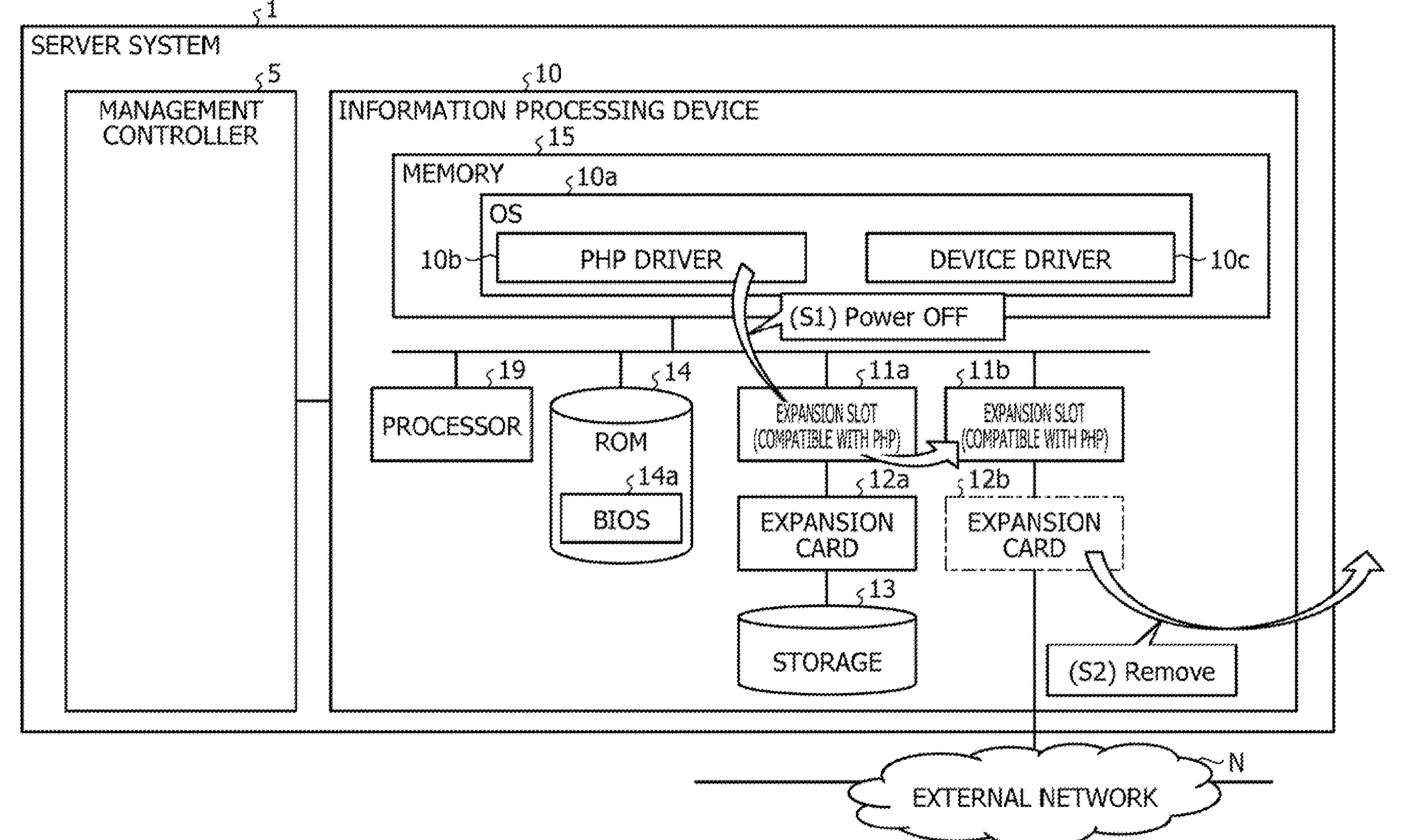
FIG. 5 is a diagram for explaining PHP activation exchange.
Figure 6:
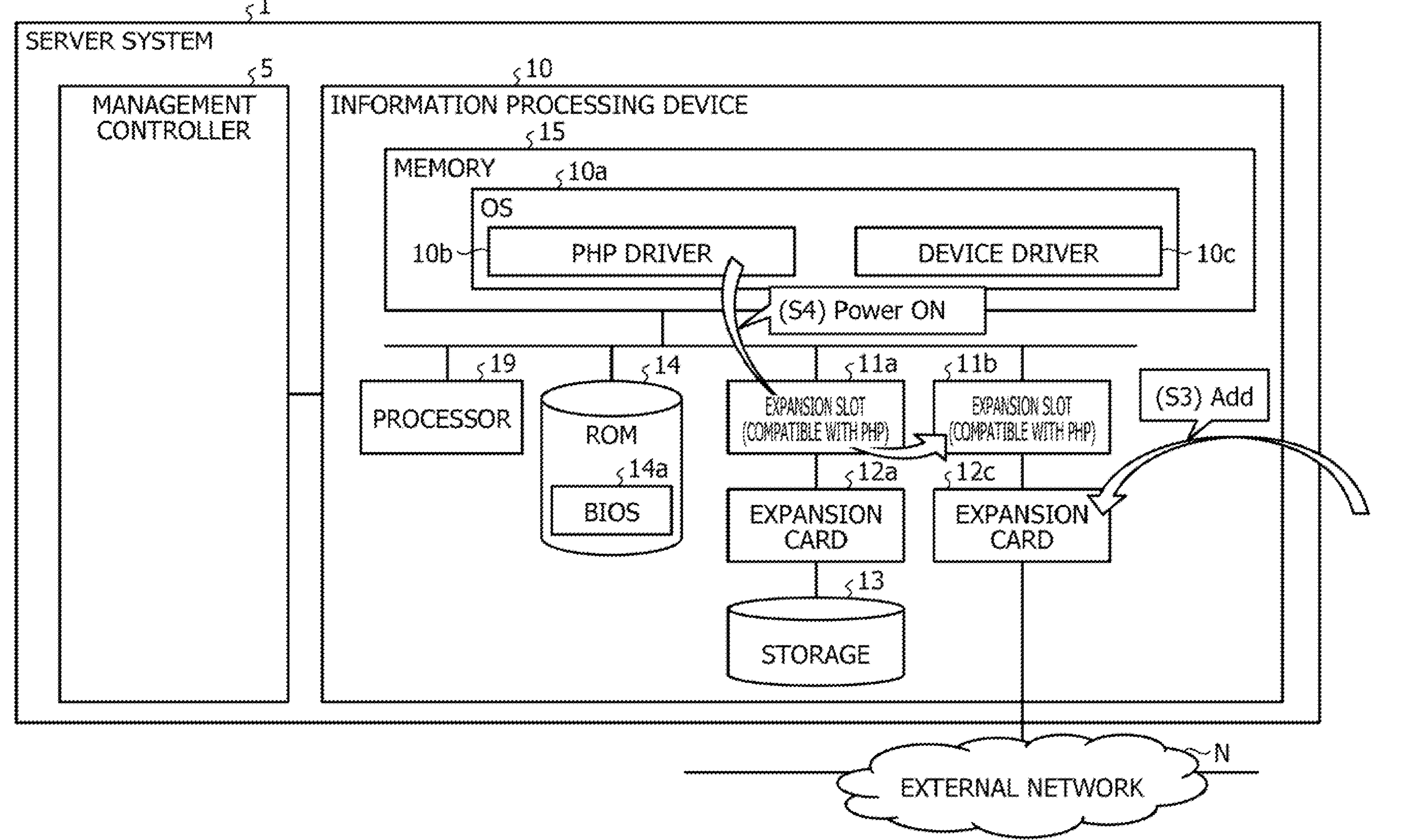
FIG. 6 is a diagram for explaining the PHP activation exchange.

In recent years, the PHP that can exchange the expansion card while operating the system has been used. FIGS. 5 and 6 are diagrams for explaining PHP activation exchange. As illustrated in FIG. 5, in the server system 1 compatible with the PHP, some or all of the expansion slots of the information processing device 10 are compatible with the PHP. Furthermore, the OS 10*a* includes a PHP driver 10*b* that manages PHP operations, in addition to a general device driver 10*c*.

Here, the activation exchange by the PHP will be specifically described. As illustrated in FIG. 5, an operation of the OS 10*a* from a user turns off power of the expansion slot 11*b* via the PHP driver 10*b* (S1 in FIG. 5). Subsequently, after turning off the power of the expansion slot 11*b*, the user removes the expansion card 12*b* under the expansion slot 11*b* (S2 in FIG. 5).

Thereafter, as illustrated in FIG. 6, the user inserts a new expansion card 12*c* into the expansion slot 11*b* (S3 in FIG. 6). Then, the OS 10*a* detects the insertion of the expansion card 12*c* by an interrupt from the expansion slot 11*b* or polling of a hardware register and turns on the power of the expansion slot 11*b* via the PHP driver 10*b* (S4 in FIG. 6).

Moreover, after turning on the power of the expansion slot 11*b*, the OS 10*a* allocates hardware resources using the PHP driver 10*b* and the device driver 10*c*, initializes the expansion card 12*c*, and sets an available state. Depending on the expansion card 12*c*, there is a case where there is a need for a user's work for restoring setting information of a storage, a network, or the like connected to the expansion card 12*c* after the activation exchange.

Note that, even in a case where the expansion card 12*b* is removed before the power of the expansion slot 11*b* is turned off by the operation on the OS 10*a*, the activation exchange can be performed with a surprise hot-remove function of the PHP. Because the expansion card is physically inserted into and removed from the PHP, it is necessary to provide a physical mechanism coping with the insertion and the removal in the server system 1. Furthermore, a light emitting diode (LED) indicator used to inform the user of whether or not to the removal can be performed is added. Therefore, a manufacturing cost of the server system compatible with the PHP tends to increase as compared with an incompatible server system.

[Change of CNA Operation Mode]

Next, an operation change of a CNA-format expansion card that has been often used in recent years will be described. Because an operation mode of the CNA is unique to the CNA, setting from the BIOS or the private setting software is needed for the change. Here, in a case where the card vendor does not provide the private setting software to the OS used in the system, the settings from the BIOS have to be used.

Therefore, it is necessary to reset hardware of the expansion card in order to reflect the change in the operation mode of the CNA. Furthermore, in order to correctly operate the expansion card in which the change in the operation mode is reflected by the OS, it is necessary to change the allocation of the hardware resources or to reset the device driver to be used. The hardware of the expansion card can be reset, for example, by operating a hardware register that is uniquely mounted on a slot vendor with respect to the expansion slot that mounts the target expansion card. Furthermore, if the expansion slot is compatible with the PHP, it is possible to reset the hardware by turning off or on the power.

However, it is not realistic for the card vendor to implement processing conscious of the unique hardware register and processing that assumes the expansion slot that is compatible with the PHP in the private setting software. After changing the operation mode with the private setting software, there is a possibility that the hardware can be reset through a user's operation. However, it is necessary to make the user aware of a hardware register operation specific for the server system, and a load of the user increases.

Furthermore, it is possible to make the PHP driver of the OS change the allocation of the hardware resources and reset the device driver to be used after the change in the operation mode is reflected, by removing and inserting the expansion card, of which the operation mode has been changed, with the PHP. However, this method requires the expansion slot of the server system to be compatible with the PHP, and this increases the manufacturing cost. Furthermore, it is necessary for the user to physically remove and insert the expansion card, and the load of the user increases.

[Problem]

As described above, this is not limited to the CNA and is a common problem for an expansion card that uses the private setting software for the setting change specific for the expansion card, requires the hardware reset to reflect the settings, and needs to change the allocation of the hardware resources and to reset the device driver to be used after the setting reflection. To request to stop the system for the setting change of each expansion card corresponding to the above, of the plurality of expansion cards mounted on the server system 1 illustrated in FIG. 1, deteriorates operation continuity of the system. For example, in a case of a large server system, there is a case where it takes a long time, such as several tens of minutes, to restart the system due to the large amount of the processors, the memories, the expansion cards to be mounted. Therefore, a technology will be described in which the server system 1 according to the first embodiment changes the settings of the expansion card without stopping the system regardless of the OS.

[Functional Configuration]

Next, a functional configuration of the server system 1 according to the first embodiment will be described. FIG. 7 is a block diagram for explaining functions of the information processing device 10 according to the first embodiment.

Note that the management controller 5 is a computer or the like that is used to manage the server system 1, the information processing device 10, or the like and is, for example, a baseboard management controller (BMC) or the like. For example, the management controller 5 includes a user interface that is used by a user to manage, operate, and set a server. In the present embodiment, the setting change of the expansion card is instructed from this user interface, and a virtualization processing unit 30 (virtual machine monitor) is notified.

As illustrated in FIG. 7, the information processing device 10 according to the first embodiment includes hardware 20 and the virtualization processing unit 30 that is executed by the virtualization execution unit 19*a* of the processor 19 in FIG. 1 or the like. Furthermore, although a virtual machine 40 and a setting-dedicated virtual machine 50 are executed by the virtualization processing unit 30 in the information processing device 10, the number or the like are examples, and any number of virtual machines can be executed.

The hardware 20 includes an expansion slot 21 and an expansion card 22 that are the physical resources of the information processing device 10. The expansion slot 21 is a connection terminal on which the expansion card 22 is mounted. Although it is assumed that this expansion slot 21 have a reset function that can be directly or indirectly (via management controller 5 or the like) executed from the virtualization processing unit 30, it is not necessary for the expansion slot 21 to be compatible with the PHP. Note that the general reset functional unit 21*a* used to reset hardware of the expansion card 22 is mounted on the expansion slot 21.

Furthermore, the expansion card 22 is an expansion card to be a setting change target in the first embodiment. This expansion card 22 includes the EFI driver 22*a* described above and setting information 22*b* in which operation information or the like is defined (set), the setting information 22*b* being provided in a nonvolatile region.

As an example of the virtual machine to be executed by the virtualization processing unit 30, in the first embodiment, the virtual machine 40 that makes the OS operate so as to operate the system and the setting-dedicated virtual machine 50 that changes the settings of the expansion card 22 on the BIOS are operated.

The virtual machine 40 includes a virtual expansion slot 41 and an OS 42. The virtual expansion slot 41 is an expansion slot to be provided by the virtualization processing unit 30 to the virtual machine 40. The OS 42 executes a device driver 42*a* used to use hardware and a PHP driver 42*b* that conforms to a PHP function.

The setting-dedicated virtual machine 50 includes a virtual expansion slot 51 and a setting menu execution unit 52. The virtual expansion slot 51 is an expansion slot that is provided by the virtualization processing unit 30 to the setting-dedicated virtual machine 50. The setting menu execution unit 52 provides a menu to change the settings of the expansion card 22 to the user. Note that the setting-dedicated virtual machine 50 is operated by the virtualization processing unit 30 as needed.

Each of the virtual machines described above can use the expansion card 22 as in the physical environment by making the expansion card 22 perform PCI pass-through to each virtual machine during the system operation. Furthermore, the virtual expansion slot 41 in the virtual machine 40 is presented to the OS 42 as assuming to be compatible with the PHP through device emulation. By presenting the virtual expansion slot 41 to be compatible with the PHP, the expansion card 22 can be temporarily allocated to the setting-dedicated virtual machine 50 at the time of setting change. Furthermore, a hardware resource allocation change and reset of the device driver 42*a* to be used are performed by the OS 42 on the virtual machine 40 after the setting change.

The virtualization processing unit 30 executes the virtual machine 40 and the setting-dedicated virtual machine 50. This virtualization processing unit 30 includes a request reception unit 31, an insertion and removal notification unit 32, a reset unit 33, an allocation change unit 34, a virtual machine operation unit 35, and a setting menu operation unit 36.

The request reception unit 31 is a processing unit that receives an operation mode change request from outside of the virtualization processing unit 30. In the first embodiment, an example will be described where the request reception unit 31 receives a request from the management controller 5. However, the embodiment is not limited to this, and for example, it is possible to receive a request by trapping an operation from the OS 42 in the virtual machine 40.

The insertion and removal notification unit 32 is a processing unit that logically notifies the OS 42 on the virtual machine 40 of occurrence of the insertion and the removal of the expansion card 22 by emulating a register of the virtual expansion slot 41 allocated to the virtual machine 40 according to the PCIe specifications.

The reset unit 33 is a processing unit that resets the hardware of the expansion card 22 by operating the reset functional unit 21*a* included in the expansion slot 21. Note that the reset functional unit 21*a* can be realized by operating the hardware register that is uniquely mounted by the slot vendor or turning off or on the power if it is an expansion slot compatible with the PHP. In a case where it is not possible for the virtualization processing unit 30 (virtual machine monitor) to directly operate the hardware register, the hardware register can be indirectly operated through the management controller 5.

The allocation change unit 34 is a processing unit that changes a designated allocation destination of the expansion card 22 from one virtual machine to another virtual machine. For example, in a case of a server platform using a known chipset, the allocation change unit 34 can be realized by using a known virtual support function and changing a virtual machine of a register access source of the expansion card 22, a direct memory access (DMA) from the expansion card 22, an allocation destination, or the like.

The virtual machine operation unit 35 is a processing unit that controls activation and stop of the virtual machine in the information processing device 10. For example, in a case of changing the settings of the expansion card 22, the virtual machine operation unit 35 operates the setting-dedicated virtual machine 50 that is stopped, and when the change of the settings of the expansion card 22 ends, the virtual machine operation unit 35 ends the operation of the setting-dedicated virtual machine 50 in operation.

The setting menu operation unit 36 is a processing unit that used to operate a setting menu on the setting-dedicated virtual machine 50 from the virtualization processing unit 30. Because the setting change menu of the expansion card can be output to a serial console, for example, this function can be realized by emulating a serial device of the setting-dedicated virtual machine 50 by the virtualization processing unit 30.

[Specific Example of Operation Mode Change]

Next, with reference to FIGS. 8 to 12, specific processing of an operation mode change (setting change) of the expansion card 22 illustrated in FIG. 7 will be described. Here, the virtual machine 40 that operates the OS 42 in order to operate the system and the setting-dedicated virtual machine 50 that changes the settings of the expansion card 22 on the BIOS when the embodiment is realized are used.

In the first embodiment, the expansion card 22 is allocated to the virtual machine 40 with the PCI pass-through. Furthermore, the expansion slot 21 on which the expansion card 22 is mounted is presented to the OS 42 as assuming that the expansion slot 21 be compatible with the PHP through the device emulation of the virtualization processing unit 30 (virtual machine monitor). It is assumed that the OS 42 in the virtual machine 40 be compatible with the PHP. The setting-dedicated virtual machine 50 includes the setting menu execution unit 52 that is a function for setting the expansion card 22 with a BIOS setting menu. The setting-dedicated virtual machine 50 is a temporary virtual machine that is not operated at the normal time and is used only in a period when the setting is changed.

(Procedure 1)

FIG. 8 is a diagram for explaining a procedure 1 for changing an operation mode of an expansion card according to the first embodiment. As illustrated in FIG. 8, a user transmits an operation mode change request using the user interface of the management controller 5, and the request reception unit 31 of the virtualization processing unit 30 receives this operation mode change request (refer to (1) in FIG. 8).

Note that the operation mode change request includes information regarding an expansion card to be changed and change content. For example, an example of the information is "{slot:7,id:0x072010DF,mode:iSCSI}" or the like. Here, "slot" is an ID of the expansion slot 21, and "id" is an identifier (VID/DID of PCIe or the like) of the expansion card 22. "0x072010DF" is an example of the CNA card, and "mode" is a change destination of the operation mode or the like.

Note that the operation mode change request does not necessarily need to be issued via the user interface of the management controller 5. For example, a method for using a hypervisor call from the OS 42 on the virtual machine 40, a method for trapping a specific register access from the OS 42 on the virtual machine 40 by the virtualization processing unit 30, a method for using the user interface provided by the virtualization processing unit 30, or the like can be considered.

Subsequently, when receiving the operation mode change request, the insertion and removal notification unit 32 notifies the virtual expansion slot 41 allocated to the virtual machine 40 of that the target expansion card 22 is removed in a pseudo manner (refer to (2) in FIG. 8). At this time, the virtualization processing unit 30 cancels the PCI pass-through between the virtual machine 40 and the expansion card 22 to be changed. Note that the removal of the card can be notified by emulating a Slot Status register and a Hot-Plug Event interrupt according to the PCIe standard.

Thereafter, in the virtual machine 40, the OS 42 that has detected the removal of the expansion card 22 deletes information regarding the expansion card 22 with a Surprise Hot-Remove handler function of the OS-standard PHP driver 42*b* (refer to (3) in FIG. 8).

According to this procedure 1, because the virtualization processing unit 30 performs device emulation as if the target expansion card 22 is removed from the virtual expansion slot 41 of the virtual machine 40 by the PHP operation, in response to the setting change instruction of the expansion card 22 transmitted from the user, an access from the OS 42 on the virtual machine 40 to the expansion card 22 is eliminated at this time.

(Procedure 2)

Figure 9:
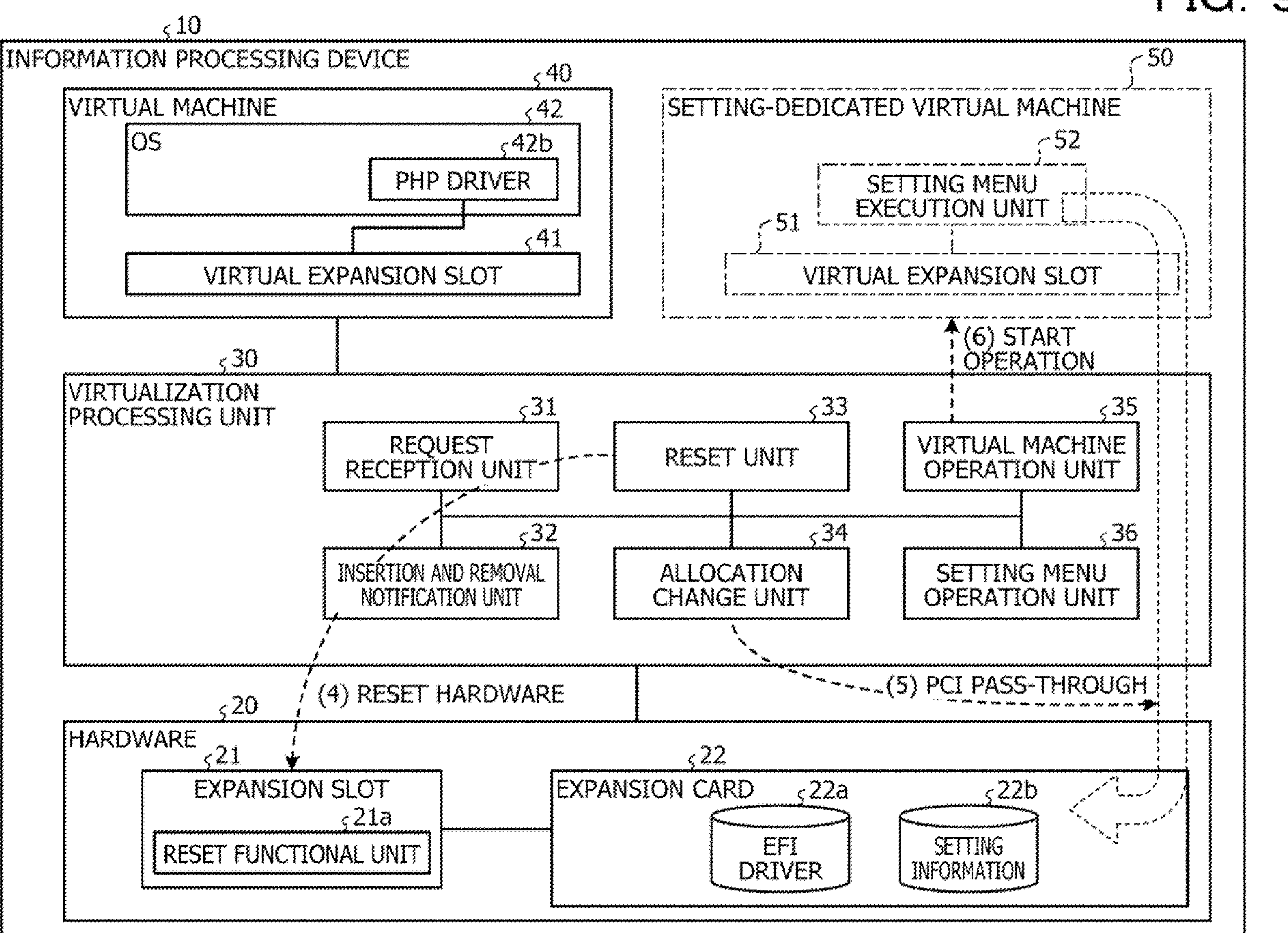
FIG. 9 is a diagram for explaining a procedure 2 for changing the operation mode of the expansion card according to the first embodiment.

FIG. 9 is a diagram for explaining a procedure 2 for changing the operation mode of the expansion card according to the first embodiment. As illustrated in FIG. 9, the reset unit 33 of the virtualization processing unit 30 performs hardware reset on the expansion card 22 that is a setting change target, by using the reset functional unit 21*a* of the expansion slot 21 (refer to (4) in FIG. 9). Here, in a case where the expansion slot 21 is compatible with the PHP, the reset unit 33 may use on/off of the power of the expansion slot 21 as a reset function. Furthermore, in a case where the reset unit 33 is not compatible with the PHP, reset can be performed by calling the reset function that is originally provided in the expansion slot 21 by the virtualization processing unit 30 or the management controller 5.

Subsequently, the allocation change unit 34 sets PCI pass-through for the expansion card 22 that is the setting change target to the setting-dedicated virtual machine 50 that sets the expansion card 22 and is temporarily activated (refer to (5) in FIG. 9).

Thereafter, the virtual machine operation unit 35 turns on the power of the setting-dedicated virtual machine 50 and then, activates the BIOS to the setting menu on the setting-dedicated virtual machine 50 (refer to (6) in FIG. 9). Note that, since the BIOS is activated by performing the PCI pass-through on the expansion card 22 that is the setting change target, the EFI driver 22*a* can be loaded, the expansion card 22 can be initialized, and the setting change menu is prepared to be displayed at this time.

According to this procedure 2, because the virtualization processing unit 30 changes card allocation and performs the PCI pass-through of the target expansion card 22 to the setting-dedicated virtual machine 50, the settings of the expansion card 22 can be changed from the setting-dedicated virtual machine 50.

(Procedure 3)

Figure 10:
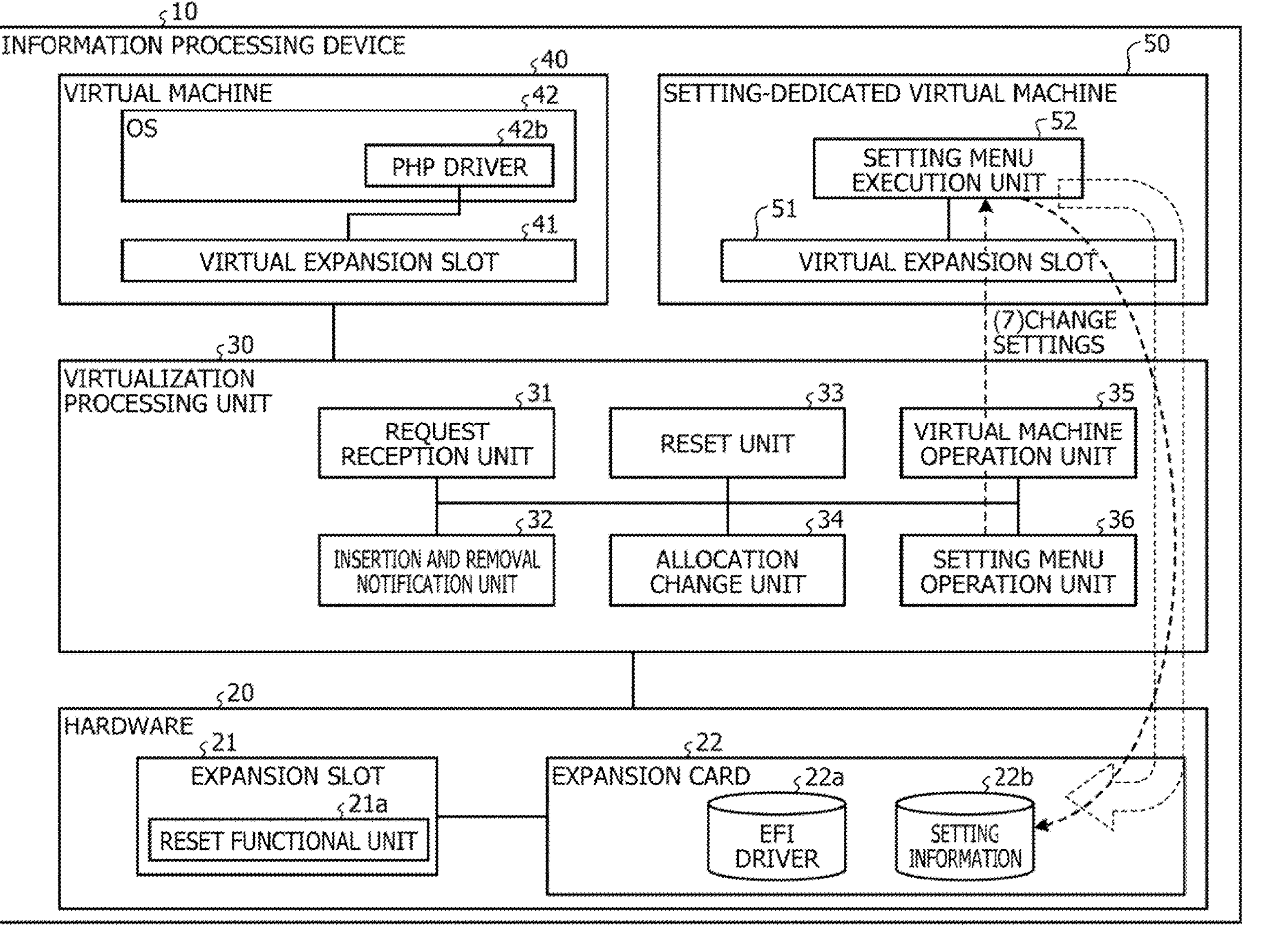
FIG. 10 is a diagram for explaining a procedure 3 for changing the operation mode of the expansion card according to the first embodiment.

FIG. 10 is a diagram for explaining a procedure 3 for changing the operation mode of the expansion card according to the first embodiment. As illustrated in FIG. 10, the virtualization processing unit 30 changes the setting information 22*b* of the expansion card 22 to content according to the operation mode change request using the setting menu provided by the setting menu execution unit 52 of the setting-dedicated virtual machine 50 and changes the settings of the expansion card 22 (refer to (7) in FIG. 10).

For example, an operation for changing the settings can be performed by the virtualization processing unit 30 with the following method, for example. For example, by imitating a behavior of the serial console in the virtualization processing unit 30, a virtual serial console is allocated to the setting-dedicated virtual machine 50. Content of the menu displayed by capturing character string information of the setting menu output from the BIOS on the setting-dedicated virtual machine 50 to the virtual serial console by the virtualization processing unit 30 of the device emulation execution source can be delivered to the setting menu execution unit 52. Moreover, the setting menu execution unit 52 of the virtualization processing unit 30 can operate the menu by imitating a keyboard input into the virtual serial console.

Note that, because the BIOS setting menu is provided in a form conforming to the UEFI specifications, the setting menu execution unit 52 can change the settings of the expansion card in a certain operation format. For example, in response to the operation mode change request "{slot:7, id:0x072010DF,mode:iSCSI}" described above, the setting menu execution unit 52 changes the setting value to "iSCSI" after searching the BIOS setting menu for a character string "Personality" that is an operation mode change menu item of the CNA card.

According to this procedure 3, the virtualization processing unit 30 changes the settings of the expansion card 22 to be changed by operating the BIOS setting menu on the setting-dedicated virtual machine 50 via the virtual serial console.

(Procedure 4)

Figure 11:
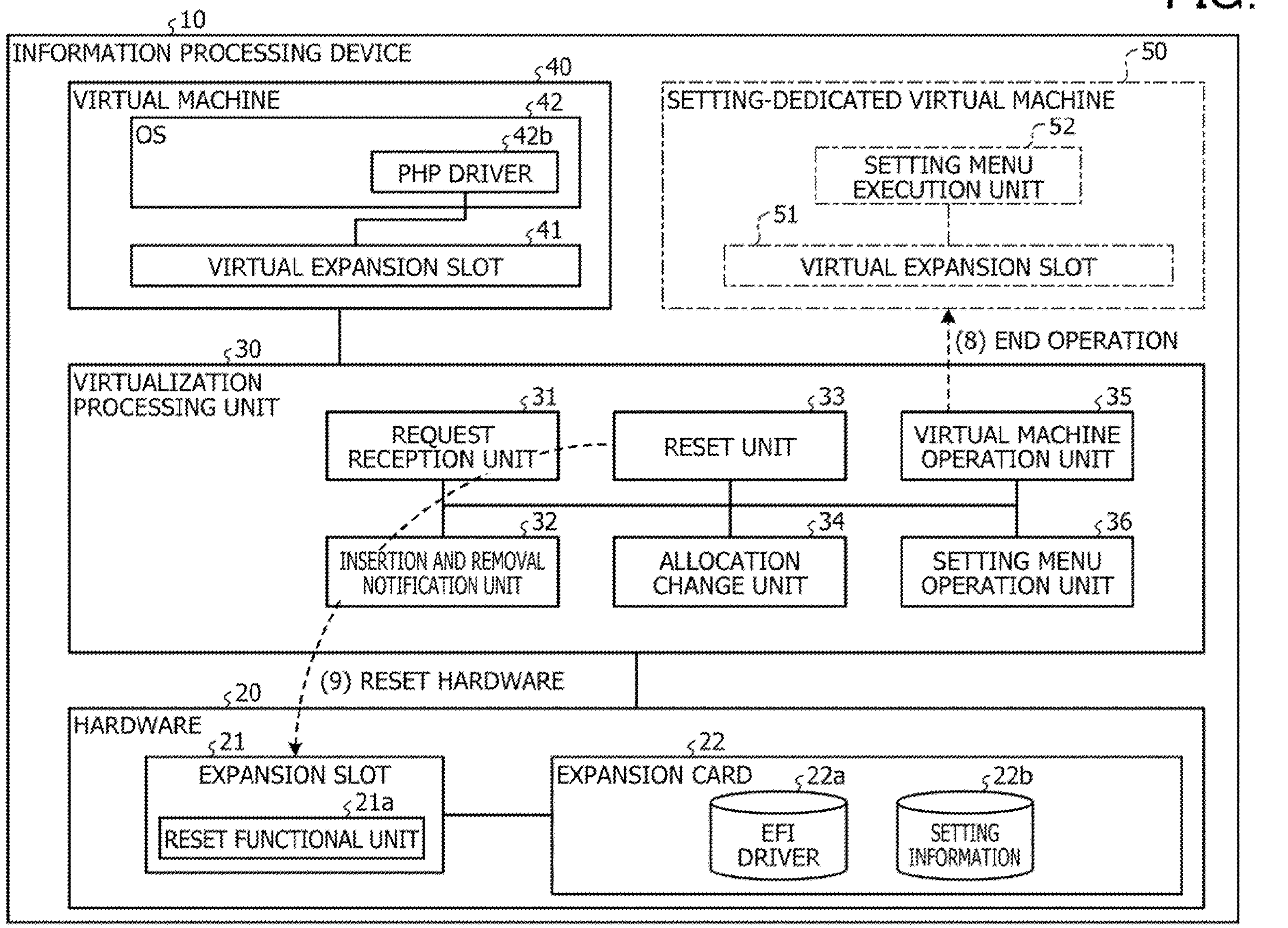
FIG. 11 is a diagram for explaining a procedure 4 for changing the operation mode of the expansion card according to the first embodiment.

FIG. 11 is a diagram for explaining a procedure 4 for changing the operation mode of the expansion card according to the first embodiment. As illustrated in FIG. 11, after completing the setting change of the expansion card 22, the virtual machine operation unit 35 of the virtualization processing unit 30 turns off the power of the setting-dedicated virtual machine 50 (refer to (8) in FIG. 11).

Subsequently, the reset unit 33 of the virtualization processing unit 30 reflects the setting change of the expansion card 22 by resetting the hardware of the expansion card 22 that is the setting change target, by using the reset functional unit 21*a* of the expansion slot 21 (refer to (9) in FIG. 11).

According to this procedure 4, the virtualization processing unit 30 can reset the hardware after the completion of the setting change of the expansion card 22 and return the PCI pass-through of the target expansion card 22 to the virtual machine 40.

(Procedure 5)

FIG. 12 is a diagram for explaining a procedure 5 for changing the operation mode of the expansion card according to the first embodiment. As illustrated in FIG. 12, the allocation change unit 34 of the virtualization processing unit 30 connects the expansion card 22 that is the setting change target to an original virtual machine 40 with the PCI pass-through (refer to (10) in FIG. 12).

Subsequently, the insertion and removal notification unit 32 notifies the OS 42 of that the target expansion card 22 is inserted via the virtual expansion slot 41 of the virtual machine 40 (refer to (11) in FIG. 12). Note that the insertion and removal notification unit 32 notifies the insertion of the expansion card 22 by emulating the Slot Status register and the Hot-Plug Event interrupt according to the PCIe standard.

Thereafter, after turning on the power of the virtual expansion slot 41, the PHP driver 42*b* of the OS 42 on the virtual machine 40 sets a state where the target expansion card 22 can be used (refer to (12) in FIG. 12).

According to this procedure 5, by performing device emulation as if the target expansion card 22 is inserted into the virtual expansion slot 41, the PHP driver 42*b* of the OS 42 on the virtual machine 40 rests the hardware resource and the device driver 42*a* to be used. As described above, the settings of the expansion card can be changed without using the private setting software and without stopping the system.

[Flow of Processing]

Figure 13:
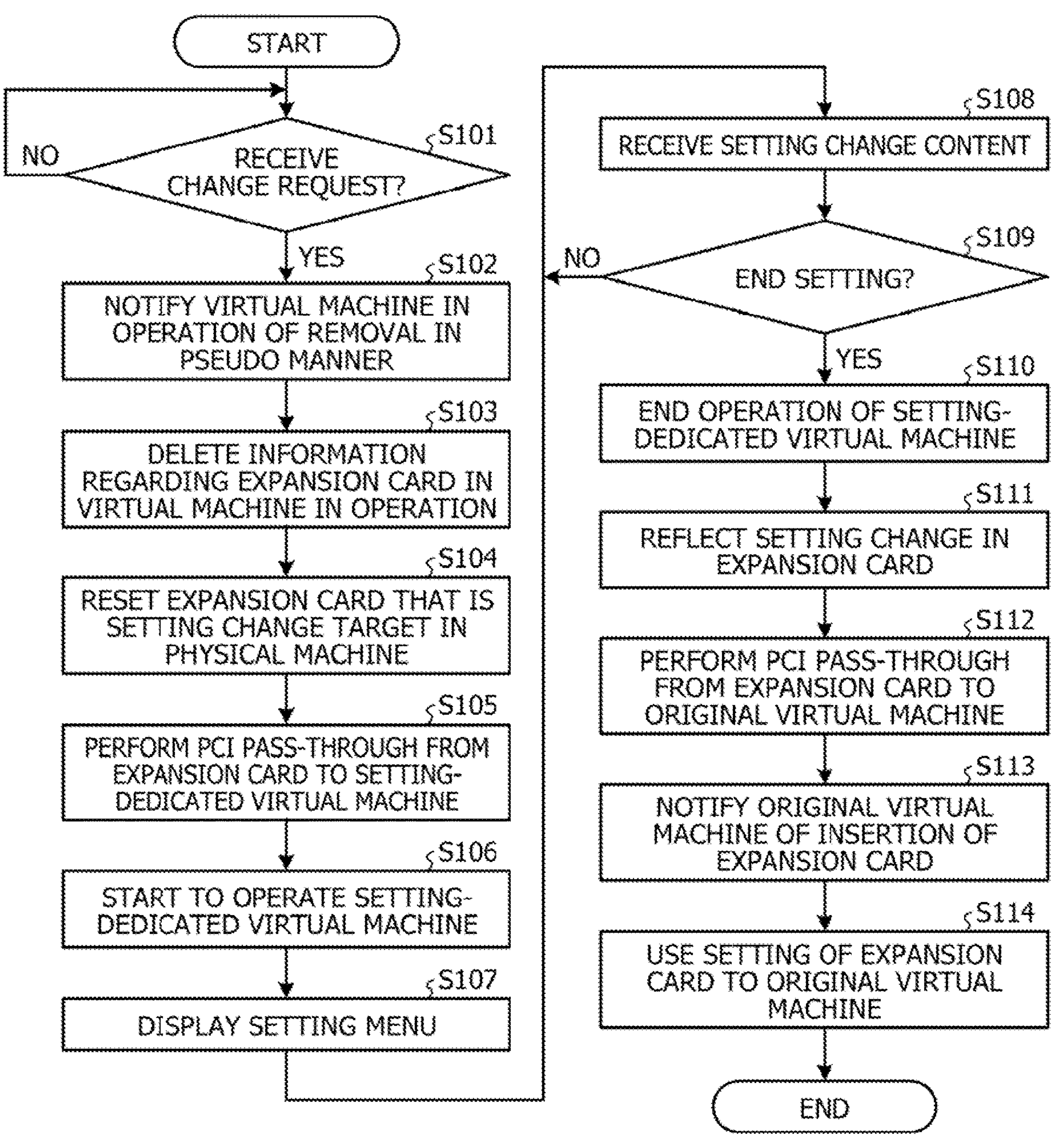
FIG. 13 is a flowchart illustrating a flow of processing for changing the operation mode of the expansion card according to the first embodiment.

FIG. 13 is a flowchart illustrating a flow of processing for changing the operation mode of the expansion card according to the first embodiment. As illustrated in FIG. 13, when receiving a change request of the setting information 22*b* of the expansion card 22 (S101: Yes), the virtualization processing unit 30 notifies the virtual machine 40 in operation of that the expansion card 22 is removed in a pseudo manner (S102).

Subsequently, the virtual machine 40 in operation deletes information regarding the expansion card 22 (S103), and the virtualization processing unit 30 resets the hardware of the expansion card 22 that is the setting change target in the information processing device 10 that is a physical machine (S104).

Then, the virtualization processing unit 30 performs the PCI pass-through from the expansion card 22 to the setting-dedicated virtual machine 50 (S105) and operates the setting-dedicated virtual machine 50 (S106). Thereafter, the virtualization processing unit 30 displays the setting menu provided from the setting-dedicated virtual machine 50 (S107).

Subsequently, the virtualization processing unit 30 receives setting change content via the setting menu (S108) and executes S108 until setting completion is received (S109: No). Here, when the setting completion is received (Yes: S109), the virtualization processing unit 30 ends the operation of the setting-dedicated virtual machine 50 (S110).

Subsequently, the virtualization processing unit 30 reflects the setting change in the setting information 22*b* of the expansion card 22 (S111), and performs the PCI pass-through from the expansion card 22 to the original virtual machine 40 (S112).

Thereafter, the virtualization processing unit 30 notifies the original virtual machine 40 of insertion of the changed expansion card 22 (S113), and the virtual machine 40 that is the original virtual machine performs use setting so that the inserted expansion card 22 can be used (S114).

[Effects]

As described above, the information processing device 10 can change the settings of the expansion card 22 without stopping the system regardless of the OS. Furthermore, for a problem caused by the setting method, because the information processing device 10 uses the settings from the BIOS, it is possible to change the settings of the expansion card 22 without depending on the OS used in the system. Furthermore, in the information processing device 10, for a problem caused by setting reflection, because the reset unit 33 of the virtualization processing unit 30 (virtual machine monitor) resets the hardware of the expansion card 22, the card vendor or the user does not need to be aware of an operation specific for the server system.

Furthermore, the information processing device 10 can solve the problem caused by the operation after the setting reflection, by causing the PHP driver of the OS to change the allocation of the hardware resources and to reset the device driver to be used. Moreover, because the actual expansion slot 21 of the information processing device 10 does not need to be compatible with the PHP and the expansion card 22 is not physically removed or inserted, an increase in the manufacturing cost and an increase in the user lead are not caused. Furthermore, because the setting-dedicated virtual machine 50 operates independently from the virtual machine 40, the setting-dedicated virtual machine 50 can execute a process different from the OS 42 on the virtual machine 40 during the setting change of the expansion card 22.

Second Embodiment

By the way, functions of an expansion card are complicated and the number of setting items increases so that an event occurs where a restoration work by a user is complicated after activation exchange of the expansion card. As described above, depending on the expansion card, there is a case where there is a need for a user's work for restoring setting information of a storage, a network, or the like connected to the expansion card after the activation exchange. In this case, the user is required to write settings of the expansion card before the activation exchange and performs the restoration work such as reset after the activation exchange. As the number of setting items of the expansion card increases, the time and effort required for this work increase, and in addition, there is a growing concern that work mistakes occur.

For this problem, a countermeasure for automating the restoration work by using software that backs up and restores the settings on the OS is considered. However, in a case where the private setting software is used for the settings of the expansion card, the automation is not easy because the user interface of the private setting software depends on implementation of the card vendor.

Moreover, the CNA described above changes to another type of device according to an operation mode, and setting items thereof also change. In order to perform the restoration work after the expansion card activation exchange, it is necessary to match the operation mode of the CNA with an operation mode before the activation exchange. However, as described above, restart of the system is required to change the operation mode. In this case, because the restoration work involves the stop of the system, an object that is the activation exchange of the expansion card during the system operation cannot be achieved.

Therefore, in the second embodiment, an example will be described where the server system 1 side can perform setting restoration after the expansion card activation exchange without stopping the system.

[Functional Configuration]

FIG. 14 is a block diagram for explaining functions of an information processing device 10 according to the second embodiment. As in the first embodiment, description will be made using a virtualization technology. As illustrated in FIG. 14, a difference from the first embodiment is that a setting storage region 23 is provided in hardware 20, a virtualization processing unit 30 includes a monitoring unit 37, an expansion slot operation unit 38, and a PHP monitoring unit 39, and a virtual expansion slot 41 of a virtual machine 40 is compatible with PHP. Furthermore, an expansion slot 21 of the hardware 20 is compatible with the PHP.

For example, the setting storage region 23 of the hardware 20 is a region where the virtualization processing unit 30 stores settings of an expansion card 22. This setting storage region 23 stores type information of the expansion card 22 before the activation exchange, a list of stored settings, or the like. Note that the setting storage region 23 can be provided in the virtualization processing unit 30.

The monitoring unit 37 of the virtualization processing unit 30 is a processing unit that monitors an access from an OS 42 of the virtual machine 40 to the virtual expansion slot 41 compatible with the PHP. The expansion slot operation unit 38 is a processing unit that performs a register operation needed for the PHP from the virtualization processing unit 30 to the expansion slot 21. The PHP monitoring unit 39 is a processing unit that detects active insertion and removal of the expansion card 22 by monitoring a register of the expansion slot 21 or an interrupt from the expansion slot 21.

[Specific Example of Expansion Card Exchange]

Next, specific processing for exchanging the expansion card 22 illustrated in FIG. 14 with a new expansion card 100, and then, setting same as that before the exchange to the expansion card 100 will be described with reference to FIGS. 15 to 23. Here, as in the first embodiment, the virtual machine 40 that operates the OS 42 in order to operate the system and the setting-dedicated virtual machine 50 that changes the settings of the expansion card 22 on the BIOS when the embodiment is realized are used.

(Procedure 1)

FIG. 15 is a diagram for explaining a procedure 1 for activation exchange of an expansion card according to the second embodiment. As illustrated in FIG. 15, an operation of the OS 42 on the virtual machine 40 turns off power of the virtual expansion slot 41 via a PHP driver 42*b* (refer to (1) in FIG. 15).

Then, the monitoring unit 37 of the virtualization processing unit 30 detects an attempt of the PHP by monitoring an access from the OS 42 of the virtual machine 40 to the virtual expansion slot 41 (refer to (2) in FIG. 15). For example, by monitoring an operation to a power indicator control (LED) on a slot control register specified in PCIe specifications, the attempt of the PHP from the OS 42 can be detected. Note that, at this stage, the LED operation from the OS 42 is not reflected in the expansion slot 21. This is because it is not desirable to remove the expansion card 22 by a user until setting information acquisition of the expansion card 22 is completed.

Subsequently, an insertion and removal notification unit 32 of the virtualization processing unit 30 notifies the virtual expansion slot 41 allocated to the virtual machine 40 of that a target expansion card 22 is removed in a pseudo manner (refer to (3) in FIG. 14). At this time, the virtualization processing unit 30 cancels PCI pass-through with the target expansion card 22.

(Procedure 2)

FIG. 16 is a diagram for explaining a procedure 2 of the activation exchange of the expansion card according to the second embodiment. As illustrated in FIG. 16, a reset unit 33 of the virtualization processing unit 30 resets hardware of the expansion card 22 to be exchanged by turning on and off power of the expansion slot 21 (refer to (4) in FIG. 16).

Subsequently, the virtualization processing unit 30 connects the expansion card 22 to be exchange to the setting-dedicated virtual machine 50 with the PCI pass-through (refer to (5) in FIG. 16). Then, a virtual machine operation unit 35 of the virtualization processing unit 30 turns on the power of the setting-dedicated virtual machine 50, and then, activates a BIOS to a setting menu on the setting-dedicated virtual machine 50 (refer to (6) in FIG. 16).

(Procedure 3)

Figure 17:
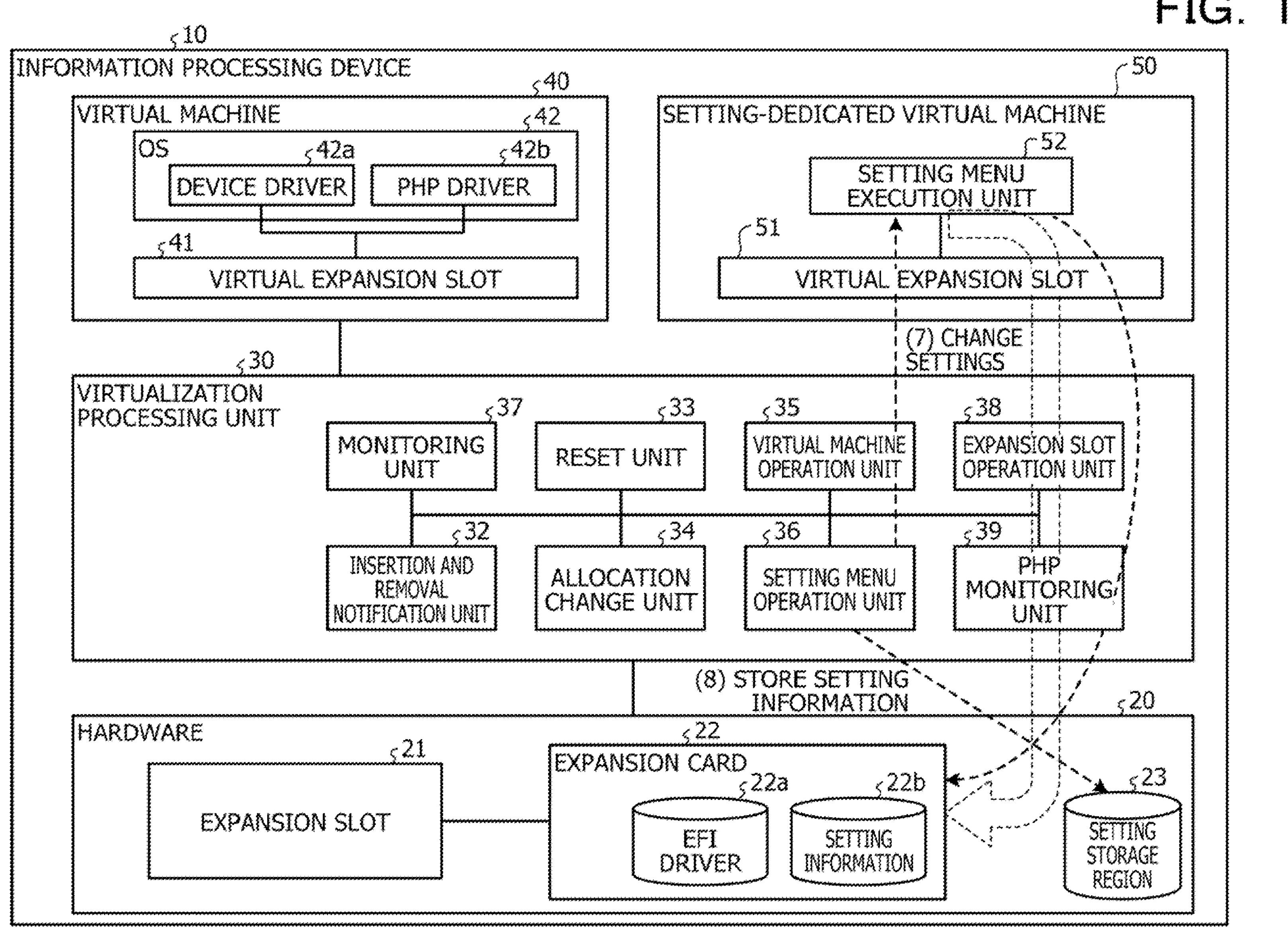
FIG. 17 is a diagram for explaining a procedure 3 for the activation exchange of the expansion card according to the second embodiment.

FIG. 17 is a diagram for explaining a procedure 3 of the activation exchange of the expansion card according to the second embodiment. As illustrated in FIG. 17, a setting menu operation unit 36 of the virtualization processing unit 30 acquires setting information 22*b* of the expansion card 22 to be exchanged, by using the setting menu provided by the setting menu execution unit 52 on the setting-dedicated virtual machine 50 (refer to (7) in FIG. 17).

Subsequently, the setting menu operation unit 36 of the virtualization processing unit 30 stores the acquired setting information 22*b* into the setting storage region 23. For example, as an example of the setting information, a format for storing identification information of the expansion card 22 and content of the settings such as "{slot:7,id: 0x072010DF,settings:{item1:settingLitem2:setting2,sub-menuA:{item A-1:settingA-1,itemA-2:settingA-2},item3: setting3}}" or the like can be adopted.

(Procedure 4)

Figure 18:
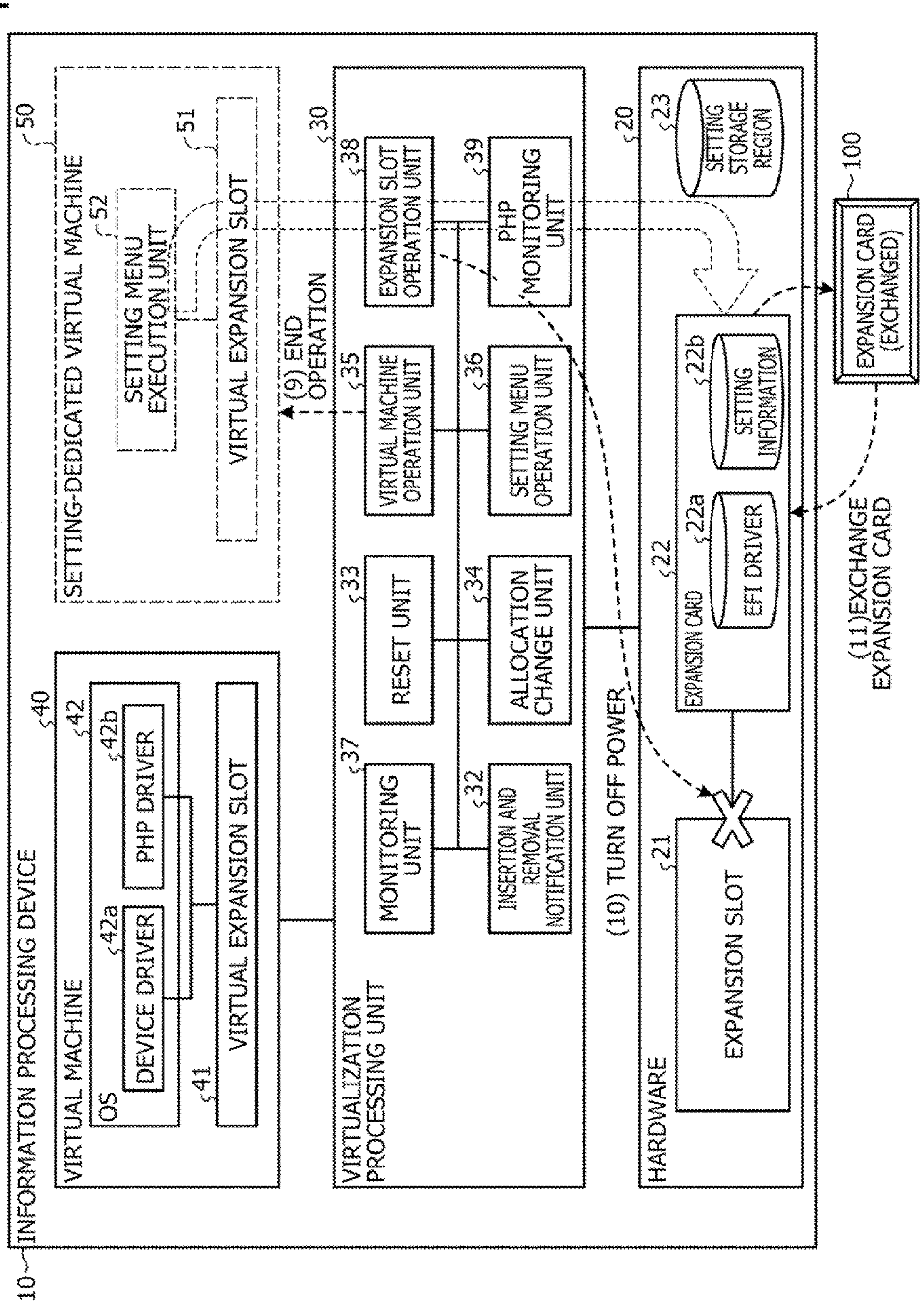
FIG. 18 is a diagram for explaining a procedure 4 for the activation exchange of the expansion card according to the second embodiment.

FIG. 18 is a diagram for explaining a procedure 4 for the activation exchange of the expansion card according to the second embodiment. As illustrated in FIG. 18, after completing the storage of the setting information 22*b* of the expansion card 22, the virtual machine operation unit 35 of the virtualization processing unit 30 changes the power of the setting-dedicated virtual machine 50 to off (refer to (9) in FIG. 18).

Subsequently, the expansion slot operation unit 38 turns off the power of the expansion slot 21 and causes a state where the expansion card 22 to be exchanged can be inserted or removed (refer to (10) in FIG. 18). Here, the expansion slot operation unit 38 notifies a user of that active insertion and removal can be performed, by performing the LED operation of the expansion slot 21 by a register access conforming to the PCIe specifications.

Thereafter, the user removes the target expansion card 22 from the expansion slot 21, inserts the same type of the expansion card 100 into the expansion slot 21, and exchanges the expansion cards (refer to (11) in FIG. 18).

(Procedure 5)

Figure 19:
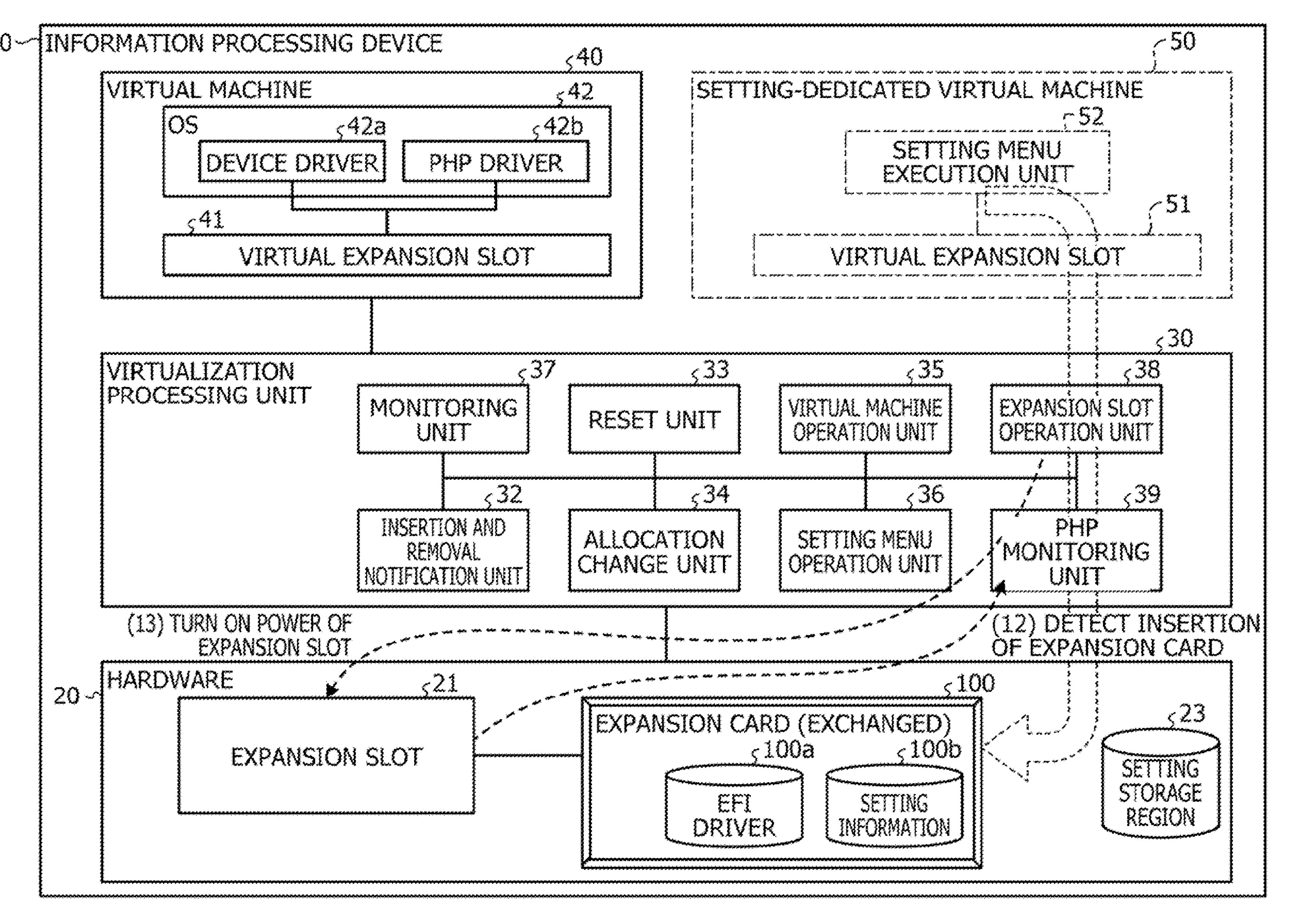
FIG. 19 is a diagram for explaining a procedure 5 for the activation exchange of the expansion card according to the second embodiment.

FIG. 19 is a diagram for explaining a procedure 5 for the activation exchange of the expansion card according to the second embodiment. As illustrated in FIG. 19, the PHP monitoring unit 39 of the virtualization processing unit 30 detects the insertion of the expansion card 100 by an interrupt from the expansion slot 21 or polling of a hardware register (refer to (12) in FIG. 19). Subsequently, when detecting the insertion of the expansion card, the expansion slot operation unit 38 turns on the power of the expansion slot 21 (refer to (13) in FIG. 19).

(Procedure 6)

Figure 20:
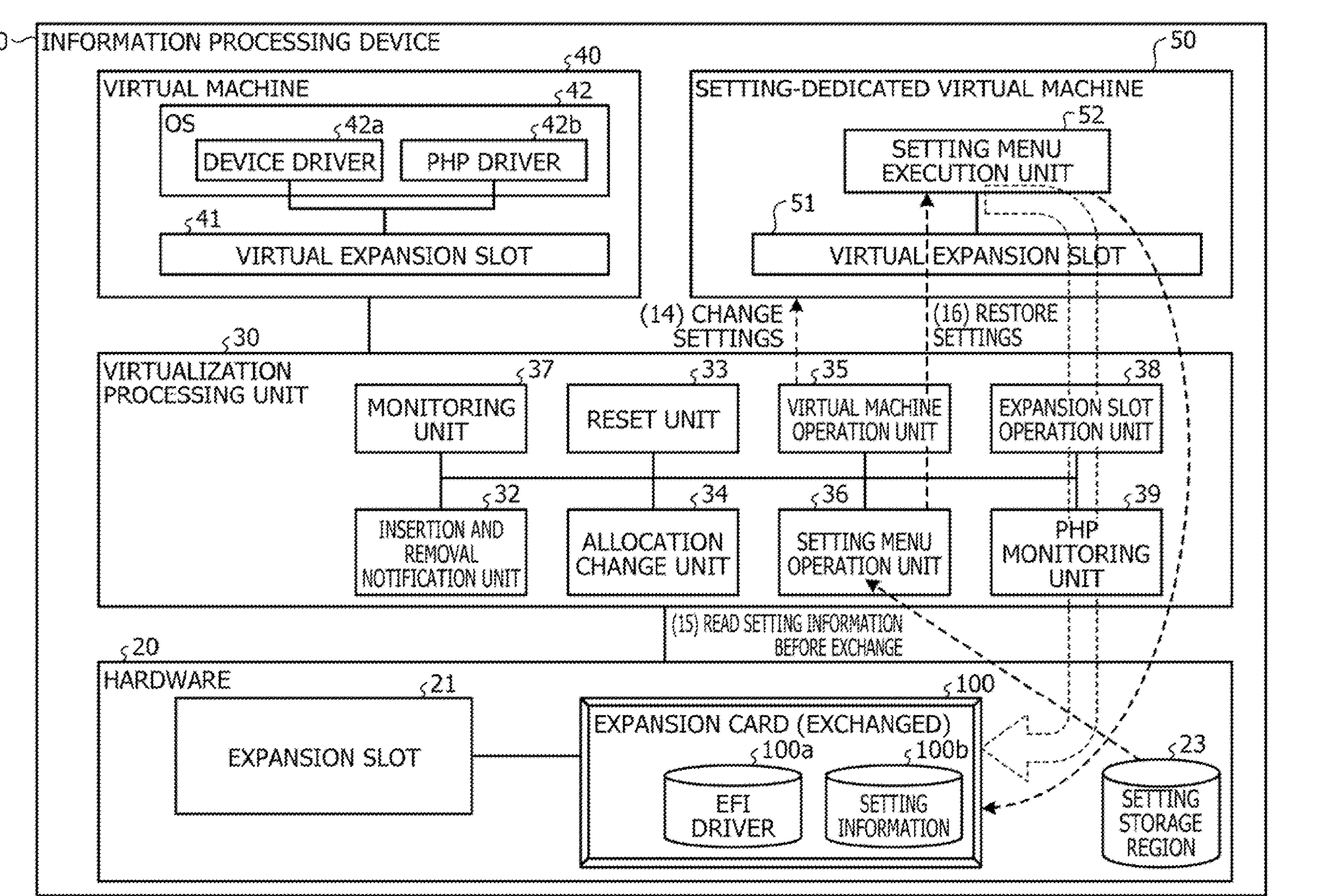
FIG. 20 is a diagram for explaining a procedure 6 for the activation exchange of the expansion card according to the second embodiment.

FIG. 20 is a diagram for explaining a procedure 6 of the activation exchange of the expansion card according to the second embodiment. As illustrated in FIG. 20, the virtual machine operation unit 35 of the virtualization processing unit 30 performs the PCI pass-through from the expansion card 100 to the setting-dedicated virtual machine 50 and activates the BIOS to a setting menu on the setting-dedicated virtual machine 50 (refer to (14) in FIG. 20).

Subsequently, the setting menu operation unit 36 reads the setting information of the expansion card 22 before exchange from the setting storage region 23, using the setting menu provided from the setting menu execution unit 52 of the setting-dedicated virtual machine 50 (refer to (15) in FIG. 20).

At this time, the virtualization processing unit 30 determines whether or not the settings can be restored by confirming whether the expansion cards before and after the exchange are cards of the same type. For example, as in a CNA operation mode, in a case where it is determined that the change to the same type of card can be performed by changing the settings, (16) of the procedure 6 is performed after performing an operation mode change procedure described below. Furthermore, in a case where it is determined that the settings cannot be restored because the cards are not the cards of the same type, the virtualization processing unit 30 skips (16) of the procedure 6. In a case where the processing is skipped, as in general expansion card exchange, reset by the user after the activation exchange is needed.

Thereafter, the setting menu operation unit 36 of the virtualization processing unit 30 restores the setting information 22*b* of the expansion card 22 before exchange to setting information 100*b* of the exchanged expansion card 100, by operating the setting menu on the setting-dedicated virtual machine 50, on the basis of the read setting information (refer to (16) in FIG. 20).

(Procedure 7)

FIG. 21 is a diagram for explaining a procedure 7 of the activation exchange of the expansion card according to the second embodiment. As illustrated in FIG. 21, after completing the setting restoration of the expansion card 100, the virtual machine operation unit 35 of the virtualization processing unit 30 changes the power of the setting-dedicated virtual machine 50 to off (refer to (17) in FIG. 21).

Subsequently, the reset unit 33 of the virtualization processing unit 30 turns off and on the power of the expansion slot 21, resets hardware of the expansion card 100, and reflects the setting restoration of the expansion card 100 (refer to (18) in FIG. 21).

(Procedure 8)

Figure 22:
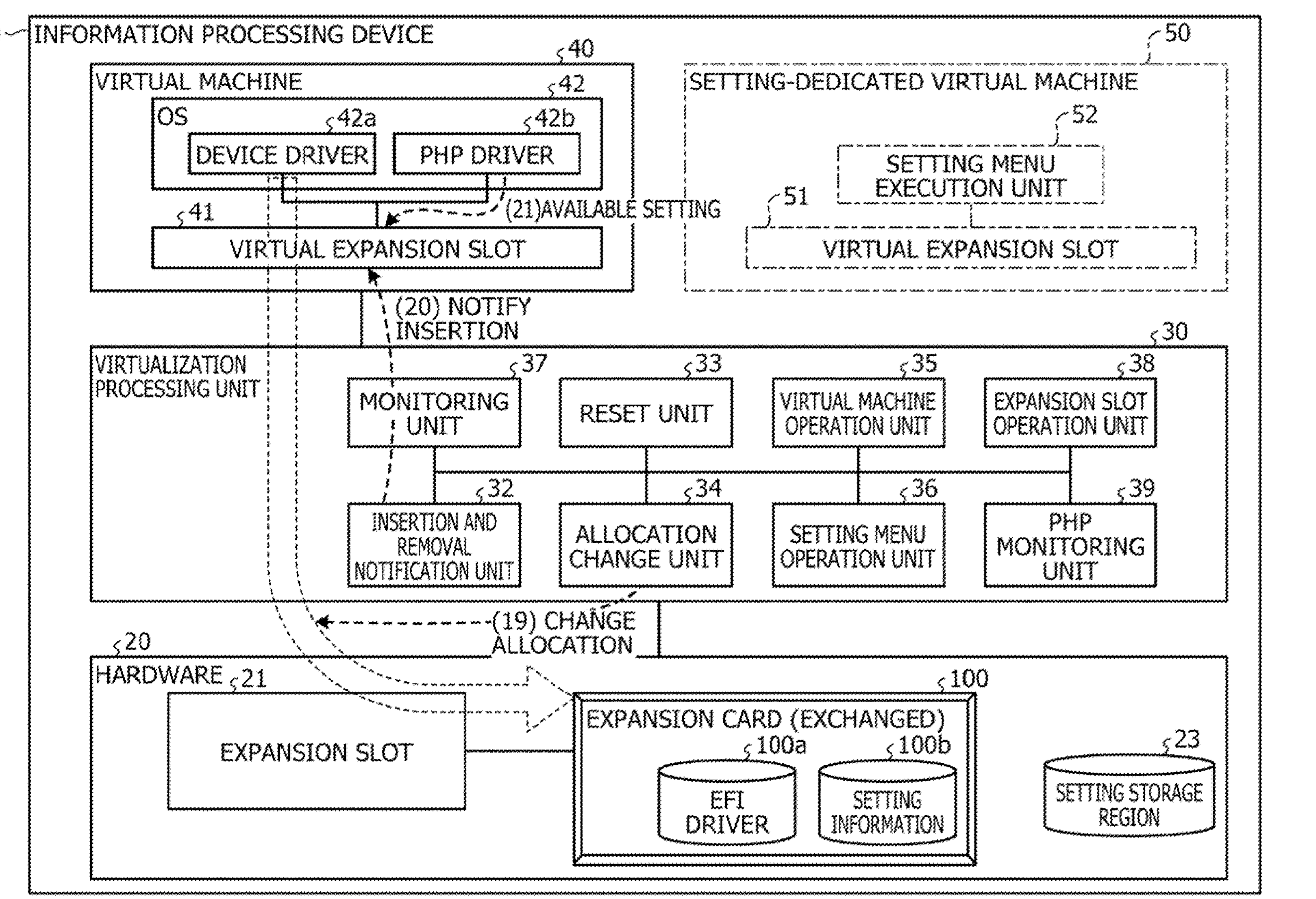
FIG. 22 is a diagram for explaining a procedure 8 for the activation exchange of the expansion card according to the second embodiment.

FIG. 22 is a diagram for explaining a procedure 8 of the activation exchange of the expansion card according to the second embodiment. As illustrated in FIG. 22, the allocation change unit 34 of the virtualization processing unit 30 changes allocation of the PCI pass-through from the target expansion card 100 to an original virtual machine 40 (refer to (19) in FIG. 22).

Then, the insertion and removal notification unit 32 notifies the OS 42 of that the target expansion card 100 is inserted, via the virtual expansion slot 41 (refer to (20) in FIG. 22). Subsequently, after turning on the power of the virtual expansion slot 41, the PHP driver 42*b* of the OS 42 on the virtual machine 40 sets a state where the expansion card 100 can be used (refer to (21) in FIG. 22).

Note that, in a case where it is determined that the change of the operation mode is needed at the time when (15) of the procedure 6 in FIG. 20 is executed, the operation mode of the expansion card 100 is changed according to a procedure illustrated in FIG. 23. FIG. 23 is a diagram for explaining a procedure for changing an operation mode at the time of the activation exchange according to the second embodiment.

As illustrated in FIG. 23, the setting menu operation unit 36 of the virtualization processing unit 30 changes the settings of the expansion card 100 so as to be the same type of operation mode as the expansion card 22 before the exchange, by operating the setting menu on the setting-dedicated virtual machine 50 (refer to (15-1) in FIG. 23).

Subsequently, after completing the setting change of the expansion card 100, the virtual machine operation unit 35 of the virtualization processing unit 30 turns off the power of the setting-dedicated virtual machine 50 (refer to (15-2) in FIG. 23). Then, the reset unit 33 turns off and on the power of the expansion slot 21 and resets the hardware of the target expansion card 100 so as to reflect the setting change of the expansion card 100 (refer to (15-3) in FIG. 23). Thereafter, the virtual machine operation unit 35 turns on the power of the setting-dedicated virtual machine 50 and activates the BIOS to the setting menu on the setting-dedicated virtual machine 50 (refer to (15-4) in FIG. 23). Thereafter, as in the first embodiment, the setting exchange using the setting menu is executed.

As described above, the setting restoration after the expansion card activation exchange can be performed without stopping the system and without manual setting by the user.

[Flow of Processing]

Figure 24:
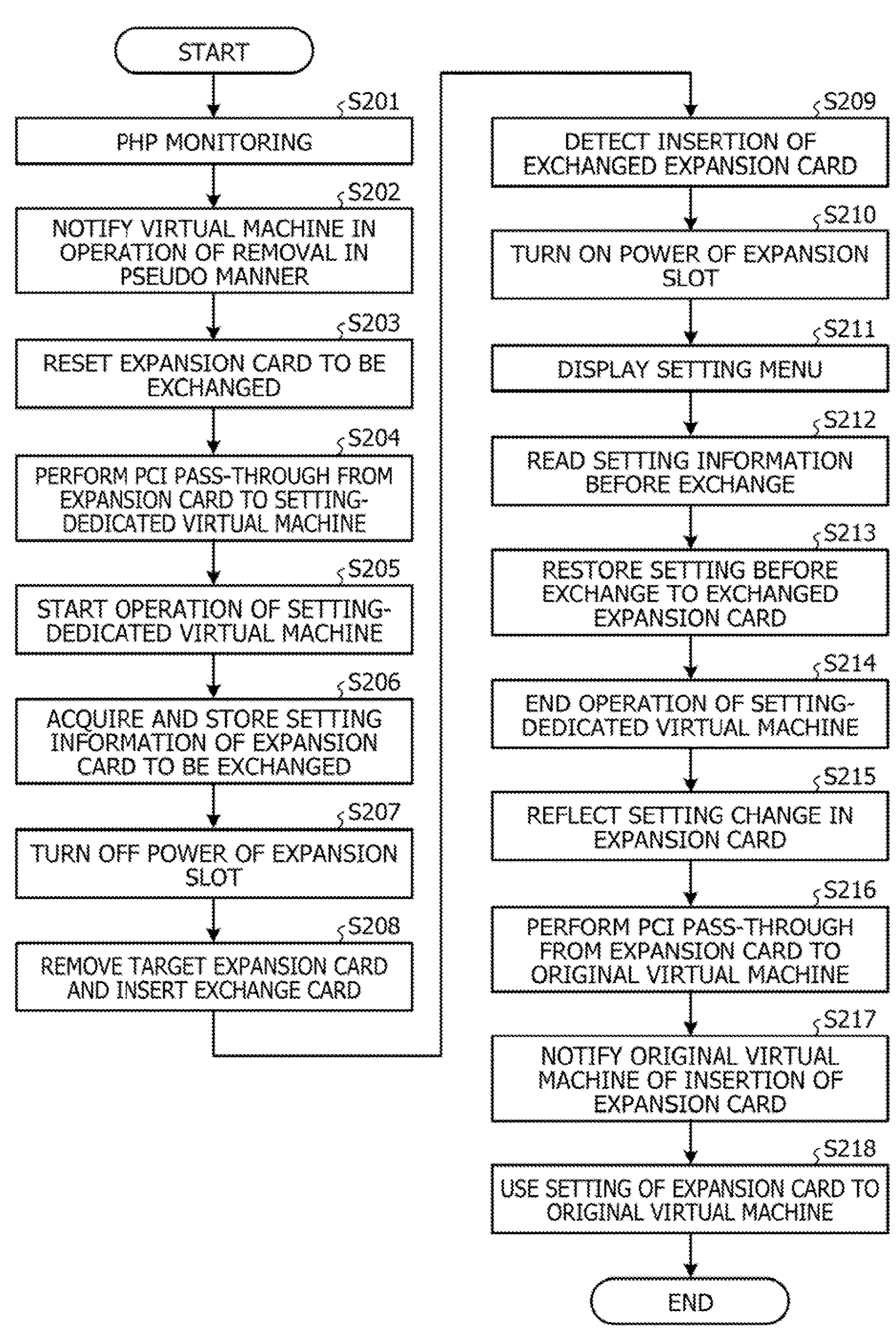
FIG. 24 is a flowchart illustrating a flow of activation exchange processing of the expansion card according to the second embodiment.

FIG. 24 is a flowchart illustrating a flow of activation exchange processing of the expansion card 22 according to the second embodiment. As illustrated in FIG. 24, the virtualization processing unit 30 monitors execution of the PHP from the OS 42 of the virtual machine 40 to the virtual expansion slot 41 (S201). Then, the virtualization processing unit 30 notifies the virtual machine 40 in operation of that the expansion card 22 is removed in a pseudo manner (S202).

Thereafter, the virtualization processing unit 30 resets the hardware of the expansion card 22 to be exchanged in the information processing device 10 that is the physical machine (S203). Then, the virtualization processing unit 30 performs the PCI pass-through from the expansion card 22 to the setting-dedicated virtual machine 50 (S204) and operates the setting-dedicated virtual machine 50 (S205).

Thereafter, the virtualization processing unit 30 acquires the setting information 22*b* of the expansion card 22 to be exchanged using the setting menu provided from the setting-dedicated virtual machine 50 and stores the acquired setting information 22*b* in the setting storage region 23 (S206). After storing the setting information 22*b*, the virtualization processing unit 30 turns off the power of the expansion slot 21 (S207).

Subsequently, the target expansion card 22 is removed by the user, and the exchanged expansion card (exchange card) 100 is inserted (S208), and the virtualization processing unit 30 detects insertion of the exchanged expansion card 100 (S209).

Then, the virtualization processing unit 30 turns on the power of the expansion slot 21 (S210), displays the setting menu provided from the setting-dedicated virtual machine 50 (S211), and reads the setting information 22*b* before the exchange from the setting storage region 23 (S212).

Subsequently, the virtualization processing unit 30 restores the settings before the exchange by storing the setting information 22*b* before the exchange as setting information 100*b* of the expansion card 100 after the exchange (S213). When completing the restoration, the virtualization processing unit 30 ends the operation of the setting-dedicated virtual machine 50 (S214).

Thereafter, the virtualization processing unit 30 turns off and on the power of the expansion slot 21 and reflects the setting change of the expansion card 100 (S215). Subsequently, the virtualization processing unit 30 changes the PCI pass-through from the expansion card 100 to the original virtual machine 40 (S216).

Then, the virtualization processing unit 30 notifies the original virtual machine 40 that has used the expansion card 22 before the exchange of the insertion of the expansion card 100 (S217), and the PHP driver 42*b* of the virtual machine 40 sets a state where the expansion card 100 can be used (S218).

[Effects]

As described above, in the server system 1 that executes a plurality of OSs through virtualization, the virtualization processing unit 30 temporarily allocates the expansion card 22 to the setting-dedicated virtual machine 50 before and after PCIe Hot-Plug on the virtual machine 40. By activating the setting menu of the expansion card of the BIOS on the setting-dedicated virtual machine 50 and operating the menu by the virtualization processing unit 30, it is possible to change the settings of the expansion card without stopping the system even on the OS to which the vendor of the expansion card 22 does not provide the private setting software, and the server system 1 side can automatically perform the setting restoration after the expansion card activation exchange without stopping the system. As a result, improvement in system availability can be expected. Furthermore, it can be expected to omit a work for writing and restoring settings before and after card exchange that has been manually performed by a maintenance personnel so far.

Third Embodiment

Incidentally, while the embodiments have been described above, the embodiment may be implemented in various different modes in addition to the embodiments described above.

[Numerical Values and the Like]

The numbers of the virtual machines, expansion cards, or the like used in the embodiments described above, setting formats, or the like are merely examples and can be arbitrarily changed.

[System]

Pieces of information including a processing procedure, a control procedure, a specific name, various types of data, and parameters described above or illustrated in the drawings may be optionally changed unless otherwise specified.

Furthermore, each component of each device illustrated in the drawings is functionally conceptual, and does not necessarily have to be physically configured as illustrated in the drawings. For example, specific forms of distribution and integration of individual devices are not limited to those illustrated in the drawings. For example, all or a part thereof may be configured by being functionally or physically distributed or integrated in optional units according to various types of loads, usage situations, or the like.

Note that the insertion and removal notification unit 32 corresponds to a first notification unit and a second notification unit, and the allocation change unit 34 corresponds to a first switching unit and a second switching unit. The setting menu operation unit 36 corresponds to an operation execution unit, and the expansion slot operation unit 38 corresponds to a slot operation unit. The virtual machine operation unit 35 corresponds to an operation control unit, and the reset unit 33 corresponds to a reset unit. Furthermore, a first virtual machine corresponds to the virtual machine 40, and a second virtual machine corresponds to the setting-dedicated virtual machine 50.

Moreover, all or an optional part of individual processing functions performed in each device may be realized by a CPU and a program analyzed and executed by the CPU, or may be realized as hardware by wired logic.

Furthermore, the information processing device 10 operates as an information processing device that executes a setting change method by reading and executing a program. Furthermore, the information processing device 10 may realize functions similar to the functions of the embodiments described above by reading the program described above from a recording medium by a medium reading device and executing the read program described above. Note that the program referred to in another embodiment is not limited to being executed by the information processing device 10. For example, the embodiments may be similarly applied to a case where another computer or server executes the program, or a case where such a computer and server cooperatively execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:

a memory;

a processor coupled to the memory; and hardware including an expansion slot, and an expansion card that conforms to a peripheral component interconnect express (PCIe) and is mounted on the expansion slot, wherein the processor is configured to perform operations comprising:

using the expansion slot with the expansion card and an operating system (OS) implemented in the information processing device to execute virtual machines that logically use hardware resources including the expansion slot with the mounted expansion card, the virtual machines each including a virtual expansion slot for use in a virtual environment, and the OS uses the expansion card by a PCIe pass-through via the virtual expansion slot;

notifying a first virtual expansion slot of a first virtual machine among the virtual machines that is an allocation destination of the expansion card, using event interruption of a PCIe Hot-Plug operation, that the expansion card is logically removed to allow the OS of the first virtual machine to delete information on the expansion card, and performing device emulation as if the expansion card is removed from the first virtual expansion slot of the first virtual machine in a case where an operation on the expansion card mounted on the expansion slot is requested while connection to the expansion card mounted on the expansion slot is provided for the first virtual machine by the PCIe pass-through via the first virtual expansion slot of the first virtual machine;

in response to notification of the logical removal of the expansion card, switching the allocation destination of the expansion card from the first virtual machine to a second virtual machine, among the virtual machines, dedicated for setting the expansion card;

in response to an end of the operation on the expansion card using the second virtual machine dedicated for the setting, switching the allocation destination of the expansion card from the second virtual machine to the first virtual machine which was an original allocation destination; and notifying the first virtual machine after the switching, using the event interruption of the PCIe Hot-Plug operation, that the expansion card on which the operation has ended is logically inserted into the expansion slot, such that the OS of the first virtual machine is capable of setting the expansion card to an available state by the PCIe pass-through, and performing device emulation as if the expansion card is inserted into the first virtual expansion slot of the first virtual machine, wherein the switching includes:

in response to the notification of the logical removal of the expansion card, temporarily operating the second virtual machine that was currently stopped, and switching the allocation destination of the expansion card from the first virtual machine to the second virtual machine, and in response to the end of the operation on the expansion card, stopping the second virtual machine, and switching the allocation destination of the expansion card from the second virtual machine to the first virtual machine.

2. The information processing device according to claim 1, wherein the processor:

changes settings of the expansion card according to received content of a setting change in a case where a content of the setting change of the expansion card is received via the second virtual machine, as the operation on the expansion card, switches the allocation destination of the expansion card from the second virtual machine to the first virtual machine in a case where the setting change to the expansion card ends, and notifies the first virtual expansion slot of the first virtual machine that the expansion card on which the settings are changed is logically inserted.

3. The information processing device according to claim 1, wherein the processor:

monitors power off of the first virtual expansion slot of the first virtual machine, from an operating system executed in the first virtual machine;

acquires setting information of the expansion card before exchanging the expansion card and stores the setting information in the memory in a case where exchange of the expansion card is received via the second virtual machine as the operation on the expansion card after the power off of the first virtual expansion slot is detected, and sets the setting information to the exchanged expansion card that is newly inserted into the expansion slot; and perform a power on of the first virtual expansion slot when the insertion of the exchanged expansion card is detected by an interrupt from the expansion slot or polling of a hardware register.

4. The information processing device according to claim 2, wherein the processor:

operates the second virtual machine that is stopped, after the operation on the expansion card is requested and the allocation destination of the expansion card is changed, receives operation content on the expansion card via a virtual serial console by using the operated second virtual machine, and stops the second virtual machine in operation in a case where the operation on the expansion card ends.

5. The information processing device according to claim 4, wherein the processor:

resets hardware of the expansion slot in a case where the operation on the expansion card mounted on the expansion slot of the information processing device is requested, switches the allocation destination of the expansion card after the hardware reset of the expansion slot, and resets the hardware of the expansion slot and reflects operation content in the expansion card in a case where the operation on the expansion card ends.

6. An operation control method comprising:

using hardware including an expansion slot and an expansion card that conforms to a peripheral component interconnect express (PCIe) and is mounted on the expansion slot, and an operating system (OS) implemented in an information processing device to execute virtual machines that logically use hardware resources including the expansion slot with the mounted expansion card, the virtual machines each including a virtual expansion slot for use in a virtual environment, and the OS uses the expansion card by a PCIe pass-through via the virtual expansion slot;

notifying a first virtual expansion slot of a first virtual machine among the virtual machines that is an allocation destination of the expansion card using event interruption of a PCIe Hot-Plug operation, that the expansion card is logically removed to allow the OS of the first virtual machine to delete information on the expansion card, and performing device emulation as if the expansion card is removed from the first virtual expansion slot of the first virtual machine in a case where an operation on the expansion card mounted on the expansion slot is requested while connection to the expansion card mounted on the expansion slot is provided for the first virtual machine by the PCIe pass-through via the first virtual expansion slot of the first virtual machine;

in response to notification of the logical removal of the expansion card, switching the allocation destination of the expansion card from the first virtual machine to a second virtual machine, among the virtual machines, dedicated for setting the expansion card;

in response to an end of the operation on the expansion card using the second virtual machine dedicated for the setting, switching the allocation destination of the expansion card from the second virtual machine to the first virtual machine which was an original allocation destination; and notifying the first virtual machine after the switching, using the event interruption of the PCIe Hot-Plug operation, that the expansion card on which the operation has ended is logically inserted into the expansion slot, such that the OS of the first virtual machine is capable of setting the expansion card to an available state by the PCIe pass-through, and performing device emulation as if the expansion card is inserted into the first virtual expansion slot of the first virtual machine, wherein the switching includes:

in response to the notification of the logical removal of the expansion card, temporarily operating the second virtual machine that was currently stopped, and switching the allocation destination of the expansion card from the first virtual machine to the second virtual machine, and in response to the end of the operation on the expansion card, stopping the second virtual machine, and switching the allocation destination of the expansion card from the second virtual machine to the first virtual machine.

7. A non-transitory computer-readable recording medium storing an operation control program which causes a computer to execute a processing of:

using hardware including an expansion slot and an expansion card that conforms to a peripheral component interconnect express (PCIe) and is mounted on the expansion slot, and an operating system (OS) implemented in an information processing device to execute virtual machines that logically use hardware resources including the expansion slot with the mounted expansion card, the virtual machines each including a virtual expansion slot for use in a virtual environment, and the OS that uses the expansion card by PCIe pass-through via the virtual expansion slot;

notifying a first virtual expansion slot of a first virtual machine that is an allocation destination of the expansion card, using event interruption of a PCIe Hot-Plug operation, that the expansion card is logically to allow the OS of the first virtual machine to delete information on the expansion card, and performing device emulation as if the expansion card is removed from the first virtual expansion slot of the first virtual machine in a case where an operation on the expansion card mounted on the expansion slot is requested while connection to the expansion card mounted on the expansion slot is provided for the first virtual machine the PCIe pass-through via the first virtual expansion slot of the first virtual machine;

in response to notification of the logical removal of the expansion card, switching the allocation destination of the expansion card from the first virtual machine to a second virtual machine, among the virtual machines, dedicated for setting the expansion card;

in response to an end of the operation on the expansion card using the second virtual machine dedicated for the setting, switching the allocation destination of the expansion card from the second virtual machine to the first virtual machine which was an original allocation destination; and notifying the first virtual machine after the switching, using the event interruption of the PCIe Hot-Plug operation, that the expansion card on which the operation has ended is logically inserted into the expansion slot, such that the OS of the first virtual machine is capable of setting the expansion card to an available state by the PCIe pass-through, and performing device emulation as if the expansion card is inserted into the first virtual expansion slot of the first virtual machine, wherein the switching includes:

in response to the notification of the logical removal of the expansion card, temporarily operating the second virtual machine that was currently stopped, and switching the allocation destination of the expansion card from the first virtual machine to the second virtual machine, and in response to the end of the operation on the expansion card, stopping the second virtual machine, and switching the allocation destination of the expansion card from the second virtual machine to the first virtual machine.

* * * * *